(12) United States Patent
Roth et al.

(10) Patent No.: US 10,731,262 B2
(45) Date of Patent: Aug. 4, 2020

(54) CORROSION CONTROL COATING

(71) Applicant: Ewald Dörken AG, Herdecke (DE)

(72) Inventors: Marcel Roth, Düsseldorf (DE); Kai Owczarek, Herdecke (DE); Heike Mertens, Hagen (DE); Sandra Böhm, Ennepetal (DE); Vanessa Kurze, Witten (DE); Gerhard Reusmann, Essen (DE)

(73) Assignee: Ewald Dörken AG, Herdecke (DE)

( * ) Notice: Subject to any disclaimer, the term of this patent is extended or adjusted under 35 U.S.C. 154(b) by 147 days.

(21) Appl. No.: 15/288,222

(22) Filed: Oct. 7, 2016

(65) Prior Publication Data

US 2017/0101716 A1 Apr. 13, 2017

(30) Foreign Application Priority Data

Oct. 9, 2015 (EP) .................................... 15189174

(51) Int. Cl.
| | |
|---|---|
| C23F 13/02 | (2006.01) |
| C23C 28/00 | (2006.01) |
| C09D 5/10 | (2006.01) |
| B05D 7/00 | (2006.01) |
| C25D 3/22 | (2006.01) |
| C23C 2/26 | (2006.01) |
| C09D 7/61 | (2018.01) |
| C23F 13/14 | (2006.01) |
| C23F 13/06 | (2006.01) |
| C23C 2/06 | (2006.01) |

(Continued)

(52) U.S. Cl.
CPC ............... *C23F 13/02* (2013.01); *C09D 5/10* (2013.01); *C09D 7/61* (2018.01); *C23C 2/06* (2013.01); *C23C 2/26* (2013.01); *C23C 28/00* (2013.01); *C23F 13/06* (2013.01); *C23F 13/14* (2013.01); *C23F 17/00* (2013.01); *B05D 7/52* (2013.01); *B05D 2202/10* (2013.01); *C08K 3/08* (2013.01); *C25D 3/22* (2013.01); *C25D 5/48* (2013.01)

(58) Field of Classification Search
CPC . C23F 13/02; C23F 13/14; C23C 2/06; C23C 28/00; C09D 5/10; C25D 3/22; B05D 7/52

See application file for complete search history.

(56) References Cited

U.S. PATENT DOCUMENTS 4,098,749 A * 7/1978 Hoshino .................. C09D 5/12
106/14.41
4,487,815 A * 12/1984 Dorsett .................... B05D 7/14
427/404

(Continued)

FOREIGN PATENT DOCUMENTS

| CN | 1944545 A | 4/2007 |
|---|---|---|
| FR | 2799211 A1 | 4/2001 |

(Continued)

OTHER PUBLICATIONS https://princetonscientific.com/materials/optical-components/yttria-stabilized-zirconium-oxide-vis-ir-range/, Retrieved Dec. 21, 2019 (Year: 2019).*

*Primary Examiner* — Francisco W Tschen
(74) *Attorney, Agent, or Firm* — Edward E. Sowers; Brannon Sowers & Cracraft PC

(57) ABSTRACT

The present invention relates to a corrosion control coating, more particularly a high-temperature corrosion control coating, and to a method for producing it.

18 Claims, 2 Drawing Sheets

(51) Int. Cl.
*C23F 17/00* (2006.01)
*C25D 5/48* (2006.01)
*C08K 3/08* (2006.01)

(56) References Cited

U.S. PATENT DOCUMENTS

| | | |
|---|---|---|
| 6,656,607 B1 | 12/2003 | Rouquier et al. |
| 2002/0119337 A1 | 8/2002 | Maze et al. |
| 2004/0137238 A1* | 7/2004 | Clerici ............... B05D 7/54 |
| | | 428/446 |
| 2005/0129964 A1* | 6/2005 | Hugo ................ B05D 7/14 |
| | | 428/458 |
| 2010/0136359 A1* | 6/2010 | Weinell .............. B22F 1/0074 |
| | | 428/553 |
| 2010/0183892 A1* | 7/2010 | Banziger ............ C09D 5/106 |
| | | 428/551 |
| 2013/0143032 A1* | 6/2013 | Iijima ................ C09D 5/106 |
| | | 428/323 |

FOREIGN PATENT DOCUMENTS

| | | |
|---|---|---|
| JP | 48018090 B | 6/1973 |
| JP | 2001049147 A | 2/2001 |
| JP | 2003531285 A | 10/2003 |
| JP | 2013013855 A | 1/2013 |
| JP | 2013119572 A | 6/2013 |
| JP | 2014152269 A | 8/2014 |
| WO | 2010043708 A1 | 4/2010 |
| WO | 2013139599 A1 | 9/2013 |

\* cited by examiner

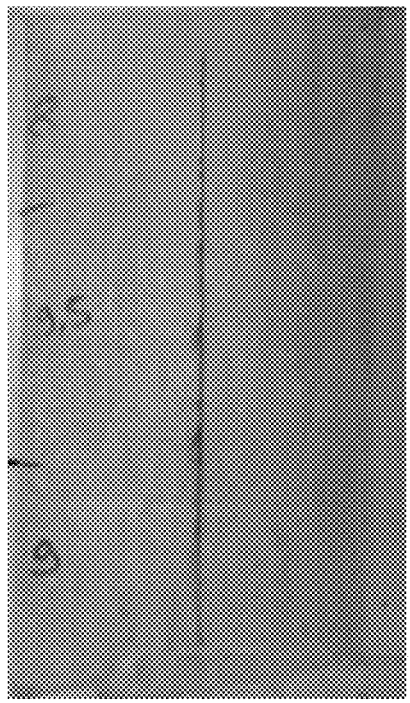 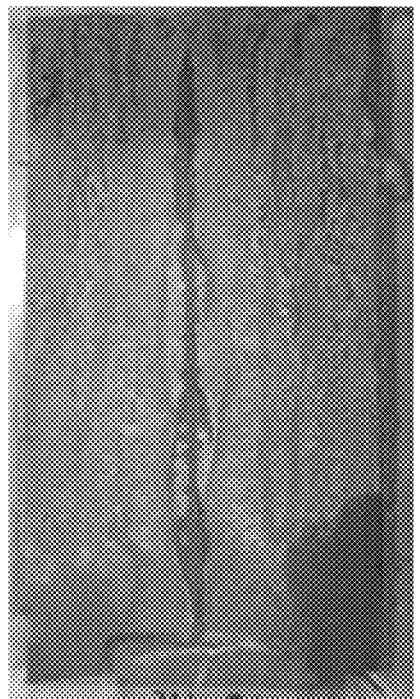
Fig. 4   Fig. 5
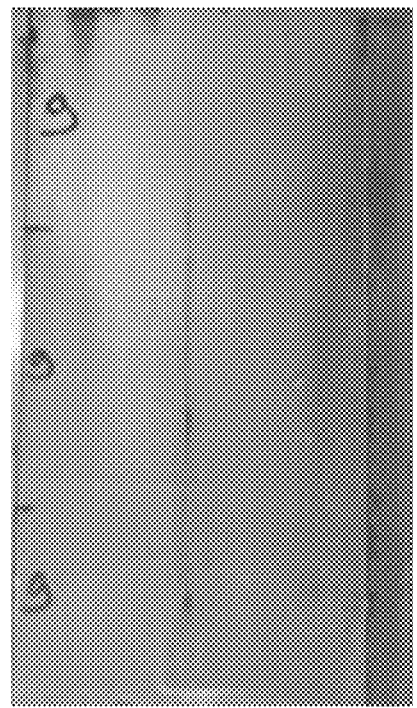
Fig. 6

CORROSION CONTROL COATING

CROSS-REFERENCE TO RELATED APPLICATION

This application claims the benefit of European Application No. EP 15 189 174.4 filed on Oct. 9, 2015, and incorporates all by reference herein, in its entirety.

BACKGROUND

The present invention relates to the technical field of corrosion control, more particularly the corrosion control of metallic substrates during and after temperature exposure.

More particularly the present invention relates to a coating, more particularly a high-temperature corrosion control coating, for generating cathodic high-temperature corrosion protection on a metallic substrate.

The present invention further relates to a first coating composition for producing a cathodic corrosion control layer and to a second coating composition for producing an oxygen barrier layer.

Furthermore, the present invention relates to a method for producing a high-temperature corrosion control coating on a metallic substrate.

Moreover, the present invention relates to a coated metallic substrate which comprises a corrosion control coating.

Moreover, the present invention relates to the use of an oxygen barrier layer for improving the temperature stability of a cathodic corrosion control coating.

Lastly the present invention relates to the use of a coating composition for improving the temperature stability of a cathodic corrosion control coating.

Signs of corrosion on metals are observed across all fields of industry, and are of high significance, since the durability or service life of machines, vehicles, industrial plant, or even buildings is dependent, often decisively so, on the corrosion properties of the metals used. Corrosion means that metal parts must be replaced or renovated, operations which always involve time, materials and costs.

According to DIN EN ISO 8044, corrosion is the physicochemical interaction between a metal and its environment that leads to a change in the properties of the metal and that can lead to considerable adverse effects on the functions of the metal, its surroundings, or the technical system in which the metals are being used. Metal corrosion generally comprises electrochemical processes, specifically the oxidation of metals by oxygen, optionally in the presence of aqueous electrolyte solutions, with formation of metal oxide layers.

Since corrosion processes often determine the durability or service life of metals or metal components, it is necessary to reduce the corrosion susceptibility and corrosion rate of metals. One way of protecting metals from corrosion is to use passive systems—coatings, for example, such as protective coatings—which are intended to protect the metal from environmental events and hence from corrosion. Another way is to use active systems, where the metal component for protection acts as a cathode—electrochemical processes are being used—and hence oxidation of the metal or metal ions formed are immediately reduced. This cathodic corrosion control may be obtained on the one hand by application of an external electrical voltage; on the other hand, however, it is also possible for the metal component for protection to be brought into contact electrically with a baser metal, i.e. one with a lower electrochemical standard potential. The two metals form an electrochemical system, in which the baser metal represents the anode, referred to as the sacrificial anode, and is oxidized, while the more noble metal is the cathode, at which reduction takes place.

One specific form of cathodic corrosion control is the coating of the metal parts for protection with a metal which is baser by comparison with the metal for protection. One particularly widespread form of the coating of metals, especially of steel sheets, is that of galvanizing. With galvanizing, steel customarily, especially steel sheets, are coated with elemental zinc by being dipped into baths of molten zinc, in a process known as hot-dip galvanizing, to produce sheets of hot dipped galvanized steel—HDGS.

A further, widespread possibility for galvanizing is electrolytic zinc plating or electrogalvanization, in which steel sheets or steel components are coated with a layer of zinc by application of an external voltage in an electrolyte bath comprising zinc ions.

Both aforementioned processes result in uniform, durable zinc coats, which are able to extend significantly the lifetimes of the metal components, but which under certain conditions of application exhibit a series of disadvantages.

In the case of higher-strength steels, the formation of hydrogen in the plating process may be a disadvantage, owing to the possibility of hydrogen embrittlement. Complex geometries or bulk material for coating, in turn, cannot be hot-dip galvanized without disadvantages, since, for example, dished regions would become filled with the zinc, or finely structured surface morphologies would become clogged with zinc.

Furthermore, coatings of pure elemental zinc do not exhibit satisfactory results under temperature load, these unsatisfactory results being blamed on the one hand on the low melting point of zinc, of around 420° C., and on the other hand on the accelerated oxidation of the zinc to zinc oxide by atmospheric oxygen even at temperatures well below the melting point.

In order to avoid at least some disadvantages of hot-dip-galvanized or electrogalvanized metal parts, what are called zinc flake coatings are often employed in practice. Zinc flake coatings contain zinc lamellae, i.e. platelet-shaped zinc pigments, in a predominantly inorganic binder. The mixture of binder and zinc lamellae is applied, customarily in the form of a dispersion, to the metal part for protection, and the binder is subsequently crosslinked to produce an impervious, homogeneous layer having a thickness of 5 to 15 μm. Despite the embedding of the zinc particles into a binder matrix, zinc flake coatings exhibit electrical conductivity and ensure high cathodic protection; in particular, in the salt spray test at the scribe mark in accordance with DIN EN ISO 9227, zinc flake coatings exhibit significantly improved corrosion resistance relative to galvanized or electrogalvanized metal parts.

Zinc flake coatings consist customarily of a predominantly inorganic matrix of silicon dioxide or titanium dioxide, in which the zinc lamellae are embedded. Typical zinc flake coatings, which are applied in the form of the corresponding coating composition, also called zinc flake primer, to a substrate, are described for example in WO 2007/130838 A2.

Under normal conditions, the coatings obtained by electrogalvanizing, hot-dip galvanizing or zinc flake coatings provide a high level of protection against corrosion; at elevated temperatures, however, the cathodic corrosion control afforded by zinc coatings, especially zinc flake coatings, reduces sharply or even breaks down completely even after short temperature exposures. For example, steel panels treated with a zinc flake primer, after undergoing temperature exposure at 200° C. over a period of several hours, or accelerated temperature exposure at 300° C., and subsequently subjected to a salt spray test with scribe mark in accordance with DIN EN ISO 9227, no longer exhibit corrosion control, or at least no longer exhibit sufficient corrosion control, a fact attributable to the oxidation of the zinc to form zinc oxide, which does not provide cathodic protection.

In the prior art, therefore, there has been no lack of attempts to increase the temperature stability of zinc coatings. In some cases, for instance, coatings of zinc alloys containing substantial fractions of manganese are used, in order to permit brief heating of coated steel parts to temperatures of 900° C. for subsequent hot shaping operations, without detriment to the cathodic corrosion control. The use of substantial amounts of manganese, however, makes this process costly. Furthermore, this type of cathodic corrosion control is resistant only to short-term temperature loads. Over the long term, cathodic corrosion control cannot be maintained at elevated temperatures.

The temperature stability of zinc-containing coatings can be obtained by what are called galvannealed processes, in which first a zinc layer is applied to a steel substrate and, by subsequent heat treatment, defined iron-zinc alloys are obtained on the surface of the substrate. Iron-zinc alloys are less sensitive both to temperature load and to mechanical stress than pure zinc coatings, but they rapidly exhibit superficial red rust, necessitating costly and inconvenient cleaning in the case of subsequent coating. In view of the susceptibility to red rust, galvannealed steel substrates have a surface of low aesthetic appeal, thus often ruling out applications in the visible sector without further coating. A further disadvantage of the galvannealed coatings is that the production of the iron-zinc alloy takes place, in a manner which is costly and inconvenient from the standpoints of technology and energy, under an inert gas atmosphere, and the coatings at a high temperature also exhibit a tendency towards increased corrosion, albeit less than in the case of pure zinc.

DE 10 2012 005 806 A1 describes a two-layer coating system, having a first layer, comprising zinc particles, and above said layer a second layer, which comprises aluminium particles. Both layers contain epoxide-modified alkoxysilanes as binders. The intention, through selection of appropriate catalysts, is to achieve simultaneous curing of both layers, thus supposedly producing well-adhering coatings having cathodic corrosion control properties. This coating as well, however, withstands only short-term temperature loads of around 300° C. without the cathodic corrosion control being dramatically reduced or broken down.

In the prior art, therefore, there is a lack of suitable active corrosion control, especially on the basis of a zinc coating, which maintains a cathodic corrosion control effect even in the event of relatively long-lasting temperature loads and subsequent to such temperature loads. A high-temperature-resistant corrosion control coating of this kind would be able for example to achieve significant increases in the durability or service life of metal parts in engines, exhaust systems and screw systems in temperature-exposed areas, energy recovery plants or industrial plants.

SUMMARY

It is an object of the invention, therefore, to provide a high-temperature corrosion control coating, where the problems and disadvantages outlined above and occurring in connection with the prior art are to be at least largely avoided or else at least attenuated.

It is a further object of the present invention to provide a coating which permits a high level of corrosion control, more particularly cathodic corrosion control, under a relatively long-lasting temperature load or interval-like temperature load. The intention in particular is to ensure that the coating still affords outstanding results following temperature exposure in a salt spray test with scribe mark in accordance with DIN EN ISO 9227.

Lastly, a further object of the present invention is seen as that of providing a coating which can be employed flexibly for a multiplicity of applications, while permitting outstanding high-temperature corrosion control.

Subject matter of the present invention according to a first aspect of the present invention is a coating, more particularly a high-temperature corrosion control coating, for generating cathodic high-temperature corrosion protection according to claim 1; further advantageous embodiments of this aspect of the invention are subjects of the relevant dependent claims.

A further subject of the present invention, according to a second aspect of the present invention, is a coating composition for producing a cathodic corrosion control coating.

Yet another subject of the present invention, according to a third aspect of the present invention, is a coating composition for producing an oxygen barrier coating.

Another subject of the present invention, moreover, according to a fourth aspect of the present invention, is a method for producing a high-temperature corrosion control coating on a metallic substrate, according to claim 12.

Further provided by the present invention, according to a fifth aspect of the present invention, is a coated substrate comprising a corrosion control coating, according to claim 13.

Yet a further subject of the present invention is the use of an oxygen barrier coating to achieve high-temperature stability of a cathodic corrosion control coating, according to claim 14.

Lastly, yet another subject of the present invention is the use of an oxygen barrier coating composition for improving the temperature stability of a cathodic corrosion control coating, according to claim 15.

It will be readily understood that characteristics, features, versions and embodiments, and also advantages or the like, which are recited hereinbelow in respect of one aspect of the invention only, for the avoidance of unnecessary repetition, self-evidently also apply mutatis mutandis in respect of the other aspects of the invention, without the need for an express mention.

It will further be readily understood that any values, numbers and ranges recited hereinbelow shall not be construed as limiting the respective value, number and range recitations; a person skilled in the art will appreciate that in a particular case or for a particular use, departures from the recited ranges and recitations are possible without departing from the realm of the present invention.

In addition, any value/parameter particulars or the like recited hereinbelow can in principle be determined using standardized or explicitly recited methods of determination or else using methods of determination that are familiar per se to the person skilled in this art.

Furthermore, it is self-evident that all weight-based or quantity-based percentages will be selected by the person skilled in the art in such a way as to result in a total of 100%; this, however, is self-evident.

Subject to the above, the present invention is now described in more detail.

BRIEF DESCRIPTION OF THE DRAWINGS

FIG. 4 shows a steel substrate provided with cathodic corrosion control coating and oxygen barrier coating, following implementation of a salt spray test with scribe mark according to DIN EN ISO 9227, after preceding temperature exposure at 400° C. for 48 hours;

FIG. 5 shows a steel sheet provided with a cathodic corrosion control coating, following implementation of a salt spray test with scribe mark according to DIN EN ISO 9227, following temperature exposure of 500° C. over 48 hours; and FIG. 6 shows a steel sheet provided with a cathodic corrosion control coating and with an oxygen barrier coating, following implementation of a salt spray test with scribe mark according to DIN EN ISO 9227, following temperature exposure of 500° C. over 48 hours.

DESCRIPTION

Figure 1:
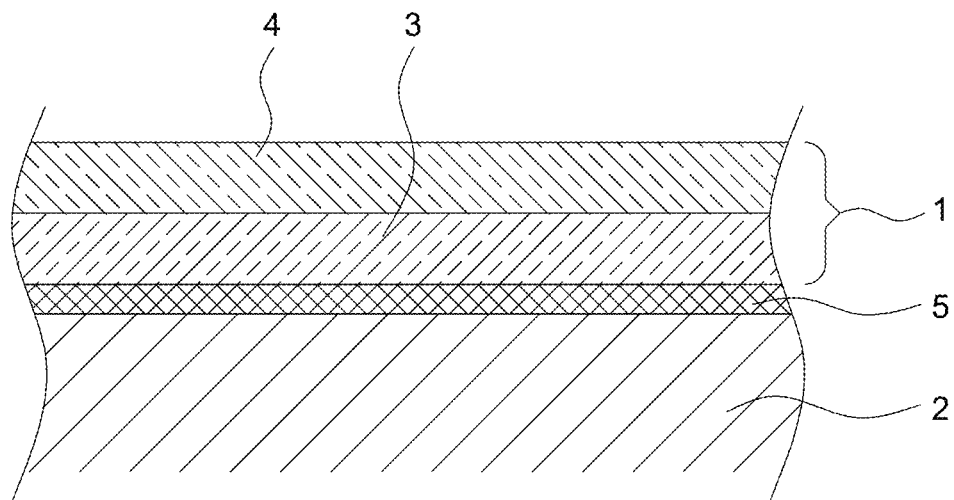
FIG. 1 shows a metallic substrate 2 provided with a coating 1 of the invention.

Subject matter of the present invention—according to a first aspect of the present invention—is therefore a coating, more particularly a high-temperature corrosion control coating, for generating cathodic high-temperature corrosion protection on a metallic substrate, comprising at least two layers, where the coating has (a) a first layer in the form of a cathodic corrosion control coating and
(b) a second layer in the form of a further corrosion control coating, more particularly in the form of an oxygen barrier coating.

In the context of the present invention it is possible, therefore, to use a coating which comprises a cathodic corrosion control layer and another corrosion control layer, more particularly an oxygen barrier layer, to provide cathodic high-temperature corrosion prevention, through which the metallic substrate is protected not only during the temperature exposure, but which, furthermore, does not lose its cathodic protection effect following temperature exposures—and in the event of repeated temperature exposure as well. The coating of the invention therefore permits not only cathodic corrosion control in the event of relatively long-lasting temperature exposure, but also, instead, in the case of interval-like temperature exposure as well, such as occurs with engines of motor vehicles, for example.

An oxygen barrier layer for the purposes of the present invention is a corrosion control layer or corrosion control coating which protects metals, especially iron and/or steel, from oxidation by gases, especially oxygen, and does so preferably at elevated temperatures. In particular, the penetration of the oxygen that is required for the oxidation of the substrate and of the first, cathodically protecting layer is prevented or at least significantly retarded by comparison with a corrosion control coating which is not further coated, or with corrosion control coatings that are coated otherwise, with varnishes or paints, for example.

Suitable oxygen barrier coatings are known in principle and are customarily used in the hot forming of metals, in particular in the hot forming of steel, as for example in the processing of press-hardenable steels—also called press hardened steel. In the processing of press-hardenable steels, the metal substrate, provided with an oxygen barrier layer, is heated to around 950° C. and then shaped (formed) under pressure. The oxygen barrier layer prevents scaling of the metal surface, i.e. the oxidation of the metal surface, and is therefore often also called a scale control layer or scale control coating. Scaling hinders the subsequent treatment of the metal substrates or the use thereof, since the layer of scale necessitates costly and inconvenient cleaning processes in preparation for subsequent coatings. The formation of the scale layer also alters the dimensions of components, and the black, brittle layer of scale adversely affects the aesthetic and surface qualities of the component as well. Not least, flaking of the scale layer may cause problems in the form of contamination in mechanical processing operations.

It has emerged that outstanding results can be obtained, in the context of the present invention, even with customary cathodic corrosion control coatings, especially those which are zinc-based, and also with a scale control coating applied thereto. This is surprising in that zinc coatings on metal, examples being electrogalvanized and hot-dip-galvanized steels, and also, in particular, zinc flake coatings on steel, lose their cathodic corrosion control effect rapidly on temperature exposure. The loss of the cathodic corrosion protection is attributable on the one hand to the oxidation of zinc and on the other hand to instances of cracking in the coating and also a partial delamination of the coating. In particular, zinc flake coatings, which at a layer thickness of 10 µm customarily exhibit red rust inhibition at the scribe mark of 1000 hours or more in the salt spray test using a scribe mark, in accordance with DIN EN ISO 9227, exhibit only a low level of cathodic corrosion control, or even no cathodic corrosion control any longer after temperature exposure at above 300° C., this deficiency applying both at the scribe mark and in the surface.

The at least two-layer coating used for the purposes of the present invention prevents this problem, since metal substrates provided with the coating of the invention still exhibit an outstanding cathodic corrosion control effect even after relatively long-lasting temperature exposure of, for example, more than 500° C. in the salt spray test with a scribe mark in accordance with DIN EN ISO 9227.

A particularly surprising fact in this context is that even on prolonged or repeated heating of substrates coated in accordance with the invention to temperatures above the melting point of elemental zinc, the cathodic corrosion control effect of the coating of the invention is retained.

As already observed above, using standard commercial cathodic corrosion control coatings and, equally, standard commercial oxygen barrier coatings, more particularly scale control coatings, it is possible to obtain outstanding results. Specially fine-tuning the two layers to one another may, furthermore, significantly improve the cathodic corrosion control at high temperature.

In particular it has emerged in the context of the present invention that the cathodic corrosion control is retained even after relatively long-lasting heating of the coated metal substrate at temperatures of 500° C. or more. It is therefore possible for the substrate provided with the coating of the invention to be heated to temperatures which lie above the melting point of pure zinc or of the zinc alloys used, without the cathodic corrosion control being reduced or even breaking down completely.

The metallic substrate customarily comprises at least one metal selected from aluminium and iron, preferably iron, or consists of alloys thereof. According to one preferred embodiment of the present invention, the substrate consists of steel.

In the context of the present invention, there is general provision that the first layer is disposed between the second layer and the substrate.

Particularly good results are obtained in the context of the present invention if the second layer is applied directly to the first layer. The coating of the invention is therefore applied preferably as a two-layer coating, consisting of a primer or a basecoat, and of a top coat, to the substrate. Provision may be made here for further layers, examples being adhesion promoter layers, such as conversion layers, to be provided between the coating and the substrate.

As far as the thickness is concerned at which the coating is applied to the substrate, it may vary within wide ranges. Particularly good results, however, are obtained if the coating has a layer thickness in the range from 0.5 to 200 μm, more particularly 1 to 180 μm, preferably 2 to 150 μm, more preferably 3 to 120 μm, very preferably 4 to 100 μm. If the first layer is applied in the form of a zinc flake coating to the substrate, the coating customarily has layer thicknesses in the range from 1 to 30 μm, more particularly 2 to 20 μm, preferably 3 to 15 μm, more preferably 4 to 10 μm. Accordingly, especially when zinc flake coatings are being used, the coating of the invention has only a low layer thickness, and so contours in the substrate remain visible and do not lose their distinctiveness or definition. Moreover, the coating according to the invention can be employed flexibly and can readily be recoated or coated.

As already observed above, the coating of the invention possesses an outstanding corrosion control effect. Customarily, in the context of the present invention, provision is made for there to be no red rust formed at the scribe mark and/or no undermining of the coating observed, on the substrate provided with the coating, in the salt spray test with a scribe mark in accordance with DIN EN ISO 9227 on evaluation according to DIN EN ISO 4628 after a preceding temperature exposure of 300° C. over 30 days within a period of at least 500 hours, more particularly 600 hours, preferably 800 hours, more preferably 900 hours, very preferably 1000 hours. For the purposes of this invention, the DIN EN ISO 9227 reference relates always to the version of the standard from September 2012, i.e. 09/2012; the DIN EN ISO 4628 reference always relates to the version of the standard from March 2013, i.e. 03/2013.

Furthermore, in the context of the present invention, no red rust is formed at the scribe mark and/or no undermining of the coating is observed, customarily, on the substrate provided with the coating, in the salt spray test with a scribe mark according to DIN EN ISO 9227 on evaluation according to DIN EN ISO 4628 after a preceding temperature exposure at 300° C. over 30 days, within a period of 500 to 3000 hours, more particularly 600 to 2500 hours, preferably 800 to 2000 hours, more preferably 900 to 1800 hours, very preferably 1000 to 1500 hours.

In general, a substrate provided with the coating of the invention, in the salt spray test with a scribe mark according to DIN EN ISO 9227, on evaluation according to DIN EN ISO 4628, after a preceding temperature exposure at 300° C. over 30 days, exhibits red rust formation at the scribe mark only after twice the test duration, more particularly five times the duration, preferably ten times, more preferably twenty times, by comparison with a cathodic corrosion control coating without an additional oxygen barrier layer.

According to one preferred embodiment of the present invention, on the substrate provided with the coating, in the salt spray test with a scribe mark according to DIN EN ISO 9227, on evaluation according to DIN EN ISO 4628, after a preceding temperature exposure at 450° C. over 48 hours, no red rust is formed at the scribe mark and/or no undermining of the coating is observed within a period of at least 80 hours, more particularly 100 hours, preferably 150 hours, more preferably 200 hours, very preferably 250 hours.

Equally it is possible that on the substrate provided with the coating, in the salt spray test with a scribe mark according to DIN EN ISO 9227, on evaluation according to DIN EN ISO 4628, after a preceding temperature exposure at 450° C. over 48 hours, no red rust is formed at the scribe mark and/or no undermining of the coating is observed within a period of 80 to 1000 hours, more particularly 100 to 800 hours, preferably 150 to 600 hours, more preferably 200 to 500 hours, very preferably 250 to 350 hours.

Customarily, a substrate provided with the coating of the invention, in the salt spray test with a scribe mark according to DIN EN ISO 9227, on evaluation according to DIN EN ISO 4628, after a preceding temperature exposure at 450° C. over 48 hours, exhibits red rust formation at the scribe mark only after three times the test duration, preferably five times the duration, more preferably ten times, very preferably twenty times, by comparison with a cathodic corrosion control coating without an additional oxygen barrier layer.

In the context of the present invention it is therefore possible that on the substrate provided with the coating, in the salt spray test with a scribe mark according to DIN EN ISO 9227, on evaluation according to DIN EN ISO 4628, after a preceding temperature exposure at 500° C. over 48 hours, no red rust is formed at the scribe mark and/or no undermining of the coating is observed within a period of at least 80 hours, more particularly 100 hours, preferably 150 hours, more preferably 200 hours, very preferably 250 hours.

Equally provision may be made for there to be, on the substrate provided with the coating, in the salt spray test with a scribe mark according to DIN EN ISO 9227, on evaluation according to DIN EN ISO 4628, after a preceding temperature exposure at 500° C. over 48 hours, no red rust formed at the scribe mark and/or no undermining of the coating observed within a period of 80 to 1000 hours, more particularly 100 to 800 hours, preferably 150 to 500 hours, more preferably 200 to 450 hours, very preferably 250 to 350 hours.

In general, a substrate provided with the coating of the invention, in the salt spray test with a scribe mark according to DIN EN ISO 9227, on evaluation according to DIN EN ISO 4628, after a preceding temperature exposure at 500° C. over 48 hours, exhibits red rust formation at the scribe mark only after twice the test duration, more particularly three times the duration, preferably five times, more preferably 10 times, very preferably 20 times, the duration, by comparison with a cathodic corrosion control coating without an additional oxygen barrier layer.

The coating of the invention therefore enables cathodic corrosion control at temperatures and/or after temperature exposures which may in fact lie above the melting temperatures of the sacrificial metals used, more particularly zinc and suitable zinc alloys. This is very surprising since, in particular, the base sacrificial metals are customarily subject to increased and rapid corrosion at elevated temperatures.

In particular, this result is surprising especially in relation to the zinc flake systems which are used preferentially in the context of the present invention. Without wishing to be tied to a theory, the improved corrosion control after temperature exposure of zinc flake systems may be attributed to the fact that the inert binder, which customarily is predominantly inorganically based, in the zinc-containing coating system ensures that the zinc particles on the one hand very largely retain their shape during melting, or that at least singular zinc islands are present in the binder, and on the other hand the zinc is additionally protected against oxidation by the binder in combination with the oxygen barrier layer.

The first layer of the coating of the invention generally has a layer thickness in the range from 0.1 to 180 µm, more particularly 0.5 to 150 µm, preferably 1 to 140 µm, more preferably 2 to 110 µm, very preferably 2 to 90 µm. If the first layer is applied in the form of a zinc flake coating to the substrate, then the first layer customarily has layer thicknesses in the range from 0.1 to 25 µm, more particularly 1 to 15 µm, preferably 2 to 10 µm, more preferably 4 to 8 µm.

Provision is customarily made in the context of the present invention for the first layer to comprise at least one metal selected from the group of zinc, aluminium, magnesium, bismuth, tin, nickel and manganese and also mixtures and alloys thereof. Preferably the metal of the first layer comprises zinc, aluminium or magnesium and also mixtures and alloys thereof. In order to enable cathodic corrosion control, the metals used must have a lower electrochemical standard potential than the substrate material, or the substrate material, as a result of passivation, especially self-passivation, must be protected from oxidation in such a way that the metal of the coating is oxidized. Relative to the substrate, the above-stated metals form the so-called sacrificial metals or the sacrificial anode, which is corroded in place of the substrate.

Good results are obtained in the context of the present invention if the first layer comprises zinc and/or zinc alloys. Zinc and zinc alloys ensure the most effective corrosion control, more particularly high-temperature corrosion control, under economically favourable conditions.

In the context of the present invention it is preferred, moreover, if the surface of the coating that faces the surroundings is, in particular, at least substantially free from iron, in particular from iron-zinc alloys. The cathodic corrosion control layers employed with preference for the purposes of the present invention are preferably not iron-zinc alloys, especially galvannealed coatings.

With regard, now, to the formation of the first layer, the metal or metals may be applied in a diversity of ways on substrate. In the context of the present invention, however, particularly good results are obtained if the first layer is formed on the basis of a zinc layer applied by electrolysis or hot-dip galvanizing.

In the case of hot-dip galvanizing, the substrate for treatment is dipped into a bath of liquid zinc and is subsequently cooled, leaving a thin zinc coating on the substrate. With electrolytic galvanizing, also called electrogalvanizing, the substrate for coating is dipped into an electrolyte bath containing zinc ions. The application of an external voltage, with the metal substrate serving as cathode, causes a uniform layer of zinc to be deposited on the metal substrate. Both hot-dip galvanizing and electrogalvanizing or electrolytic galvanizing are customary processes in the production of zinc-coated steel substrates with active cathodic corrosion control.

Optimum results are obtained in the context of the present invention if the first layer is formed on the basis of a matrix comprising metal particles, more particularly metallic anticorrosion pigments. In this context it has proved to be particularly appropriate if at least some of the metal particles contain zinc and/or zinc alloys. A matrix for the purposes of the present invention is a cured binder which preferably surrounds and fully wets the metal particles. A matrix for the purposes of the present invention comprises, in particular, inorganic systems with optionally small organic fractions, or inorganic-organic hybrid materials, which are formed preferably on the basis of optionally organically modified silicon dioxide, titanium dioxide and zirconium dioxide.

With regard to the amount of metal particles in the first layer, it may of course vary within wide ranges. For the purposes of the present invention, however, particularly good results are obtained if the first layer comprises at least 50 wt %, more particularly at least 60 wt %, preferably at least 70 wt % of metal particles, based on the first layer.

Equally, particularly good results are obtained if the first layer comprises a fraction of metal particles in the range from 50 to 95 wt %, more particularly 60 to 95 wt %, preferably 70 to 90 wt %, based on the first layer.

As it has emerged, not only is the fraction of the metal particles, in composition, or their chemical composition, critical to the generation of the cathodic protection effects, but the morphology of the particles as well has a critical influence on the corrosion protection achieved.

The first layer customarily comprises platelet-shaped and/or granular, more particularly spherical, metal particles. It is preferred if the first layer comprises platelet-shaped metal particles. Within the language of the art, platelet-shaped metal particles are also called flakes or lamellae. Platelet-shaped metal particles have a significantly lower extent in one spatial direction, referred to hereinafter as thickness; the extent in the other two spatial directions is referred to hereinafter as diameter. Granular metal particles are irregularly shaped metal particles, whereas spherical metal particles possess approximately a sphere form. The use of spherical metal particles is preferred over the use of granular metal particles.

The size of the metal particles used in accordance with the invention may likewise vary in wide ranges depending on the other conditions. Particularly good results, however, are obtained if the platelet-shaped metal particles have a thickness of 50 to 1000 nm, more particularly 60 to 750 nm, preferably 80 to 600 nm, more preferably 100 to 500 nm.

Provision may equally be made for the platelet-shaped metal particles to have a diameter of 1 to 25 µm, more particularly 2 to 20 µm, preferably 5 to 18 µm, more preferably 5 to 15 µm.

It is preferred, furthermore, in the context of the present invention if the granular, more particularly spherical, metal particles have particle diameters in the range from 500 nm to 20 µm, more particularly 500 nm to 10 µm, preferably 500 nm to 5 µm. With metal particles in the above-stated sizes, outstanding corrosion control coatings can be obtained, particularly in conjunction with precise quantitative harmonization.

In general the metal particles are formed on the basis of pure zinc and/or zinc alloys. For zinc alloys employed with preference in the context of the present invention, the zinc alloy is selected from the group of zinc-bismuth alloys, zinc-aluminium alloys and/or zinc-aluminium-magnesium alloys, more particularly zinc-aluminium alloys and/or zinc-aluminium-magnesium alloys, preferably zinc-aluminium-magnesium alloys.

According to one preferred embodiment of the present invention, the first layer comprises zinc lamellae as platelet-shaped metal particles, more particularly on the basis of pure zinc and/or of the aforementioned zinc alloys.

It has emerged that particularly good results can be obtained with platelet-shaped metal particles based on zinc-aluminium-magnesium alloys, which is surprising in that magnesium in particular customarily undergoes rapid corrosion. Surprisingly, however, it has been found that with corrosion control coatings which comprise platelet-shaped metal particles based on zinc-aluminium-magnesium alloys, a significantly improved corrosion protection can be achieved. The coating systems with platelet-shaped metal particles based on zinc-aluminium-magnesium alloys exhibit significantly improved corrosion control properties, even without additional oxygen barrier layer, relative to conventional zinc flake systems, even under temperature exposure. However, an oxygen barrier layer equally increases the temperature stability of these systems by a multiple factor.

In the context of the present invention, provision may be made for the first layer to be formed on the basis of a zinc flake coating. With zinc flake coatings, in particular, for the purposes of the present invention, particularly under high-temperature exposure, particularly good corrosion protection effects are achieved.

Furthermore, provision may be made for the first layer to comprise at least one filler in amounts of 0.5 to 10 wt %, more particularly 1 to 8 wt %, preferably 1 to 5 wt %, based on the first layer.

Fillers which can be used are almost any particulate substances which are inert and stable under application conditions—more particularly inorganic minerals, glasses, ceramic substances, and metals. It has emerged, however, that particularly good results are obtained if the filler is selected from metals, more particularly Al, Sn, Ni, Mn, Bi, W or stainless steel, and also mixtures and alloys thereof, preferably Al, more preferably aluminium flakes.

Good results are equally obtained if the filler is selected from the group of boron nitride, tungsten carbide and glasses. The fillers may be used alternatively to or together with the metallic fillers.

According to one particular embodiment of the present invention, the coating composition from which the first layer is obtained is what is called an ultra-high-solids composition, i.e. a coating composition with a solids fraction of up to 100 wt %, more particularly 95 to 100 wt %. Ultra-high-solids compositions may still have a solvent fraction of up to 5 wt %, based on the composition. This solvent fraction serves normally for adjusting the viscosity and for improving the application properties of the coating composition. It has been found that, if the coating is obtained from an ultra-high-solids composition, different preferred ranges must be selected for the amount of metal particles.

If the first layer of the coating of the invention is obtained from a coating composition having a solids fraction of 95 to 100 wt %, it has proved to be appropriate if the first layer comprises at least 35 wt %, more particularly at least 50 wt %, preferably at least 70 wt %, more preferably at least 80 wt %, of metal particles, based on the first layer.

Equally, in accordance with this embodiment, the first layer may have a fraction of metal particles in the range from 35 to 95 wt %, more particularly 50 to 95 wt %, preferably 70 to 90 wt %, more preferably 80 to 90 wt %, based on the first layer.

Particularly good results are obtained in accordance with this embodiment if the first layer comprises granular, more particularly spherical, metal particles in amounts of 35 to 95 wt %, more particularly 50 to 90 wt %, preferably 70 to 90 wt %, more preferably 80 to 90 wt %, based on the first layer. Here it has proved appropriate if the metal particles are formed on the basis of zinc or zinc alloys, preferably elemental zinc. Particularly good results are obtained in accordance with this embodiment if the granular or spherical metal particles are formed on the basis of zinc dust.

Furthermore, provision may be made, in accordance with this embodiment, for the first layer to comprise platelet-shaped metal particles in amounts of 0.1 to 50 wt %, more particularly 0.2 to 25 wt %, preferably 0.3 to 10 wt %, more preferably 0.5 to 5 wt %, based on the first layer. Particularly good results are obtained in this context if the platelet-shaped metal particles are formed on the basis of zinc or zinc alloys, preferably elemental zinc. Suitable zinc alloys are in particular the alloys stated above for zinc flake primers.

When coating compositions having a solids content of 95 to 100 wt % are used, therefore, in comparison to the solvent-based or water-based coating composition, preference is given to using spherical metal particles. This is so in particular if the aim is to obtain low-viscosity coating compositions which are applied, for example, by spray application, since spherical metal particles cause less increase in the viscosity of the coating composition than do platelet-shaped metal particles.

As observed above, the first layer of the coating of the invention may have an inorganically based matrix. In this context it has proved to be advantageous if the inorganically based matrix is organically modified, i.e. contains organic radicals and/or organic functional groups which are bonded to an inorganic framework. The effect of this is to obtain increased flexibility in the first layer and hence in the coating as a whole, thereby preventing, for example, the flaking of the coating and/or detachment from the substrate, or the formation of cracks in the coating.

Customarily the inorganically based matrix of the first layer comprises inorganic oxides, more particularly oxides of silicon, of titanium and/or of zirconium, preferably silicon dioxide and/or titanium dioxide, or consists in particular at least substantially of the aforementioned oxides. The aforementioned inorganic oxides form the framework of the inorganically based matrix, and the inorganically based matrix may also be composed of mixtures and/or cocondensates of the oxides in question.

Customarily the inorganically based matrix of the first layer is obtainable by condensation reactions of inorganic or organic groups and/or polymerization reactions of organic groups, more particularly condensation reactions of inorganic groups, from silanes, polysilanes, silane hydrolysates, polysiloxanes, siliconates, titanates, polytitanates, zirconates and mixtures thereof. Particularly good results are achieved here if the organically based matrix is obtained from silanes, silane hydrolysates, polysiloxanes, titanates, polytitanates and also mixtures thereof.

These condensation and/or polymerization reactions may be induced thermally or by electromagnetic radiation. In this context it is possible for all the reactants or catalysts needed for the condensation and/or polymerization to already be present in the ready-to-use coating composition. Alternatively, it is possible for individual reactants and/or catalysts for the initiation of the chemical reaction not to be added until shortly before or after the coating of the substrate with the coating composition, or to diffuse into the coating composition—such as atmospheric moisture, for example.

A polymerization reaction in the context of the present invention refers to reactions of functional organic groups that lead to the linking of individual molecules and/or particles which form the inorganic matrix. Polymerization reactions may take place, for example, through olefins, such as acrylates, vinyl groups or epoxides. Condensation reactions for the purposes of the present invention are reactions of two or more molecules and/or particles in which bonds are formed, with elimination of water, between the individual molecules and/or particles. Examples of condensation reactions of organic groups are esterifications or amidations. Examples of condensation reactions of inorganic groups are the reaction of inorganic acid derivatives, originating from the hydrolysis of titanates and/or alkoxysilanes and zirconates, and leading to the formation of polymeric inorganic oxides, more particularly silicon dioxide, titanium dioxide and zirconium oxide. A high fraction of inorganic compounds, i.e. in particular of silicon dioxide, titanium dioxide and/or zirconium dioxide, leads here to particularly resistant coatings which are resistant to temperature exposure, with a certain fraction of organic groups often being necessary in order to give the coatings the required flexibility. Purely inorganically based coatings are very brittle and are damaged when substantial mechanical load occurs, leading to a reduction in or loss of the cathodic corrosion control.

With regard, now, to the amount of the inorganically based matrix in the first layer, it may of course vary within wide ranges. Particularly good results are obtained, however, if the first layer comprises the inorganically based matrix in amounts of 5 to 45 wt %, more particularly 5 to 40 wt %, preferably 10 to 30 wt %, more preferably 10 to 20 wt %, based on the first layer.

According to one preferred embodiment of the present invention, the inorganically based matrix is modified by means of organic radicals. In this context it has proved appropriate for the organic radicals to be selected from alkyl, aryl and olefin radicals and also mixtures and reaction products thereof.

According to one further preferred embodiment of the present invention, the organic radicals are $C_1$ to $C_{10}$ alkyl radicals, more particularly $C_1$ to $C_5$ alkyl radicals, preferably $C_1$ to $C_3$ alkyl radicals, more preferably $C_1$ and/or $C_2$ alkyl radicals.

It is equally preferred if the organic radicals are $C_6$ to $C_{20}$ aryl radicals, more particularly $C_6$ to $C_{15}$ aryl radicals, preferably $C_6$ to $C_{10}$ aryl radicals.

Provision may additionally be made for the organic radicals to be $C_2$ to $C_{10}$ olefin radicals, more particularly $C_2$ to $C_8$ olefin radicals, preferably $C_2$ to $C_5$ olefin radicals, more preferably $C_2$ and/or $C_3$ olefin radicals, very preferably vinyl radicals. With the aforementioned organic groups it is possible to obtain particularly resistant inorganically based matrices which at the same time are flexible. It is particularly preferred if the organic radicals are methyl and/or ethyl radicals and/or vinyl radicals.

Provision may further be made in the context of the present invention for the organic radicals additionally to have polar chemical groups, selected more particularly from alcohols, ethers, thiols, amines, aldehydes, ketones, esters, amides, urethanes and/or carboxylic acids, preferably alcohols, amines and/or carboxylic acids.

The first layer of the coating of the invention is customarily obtainable by solvent-containing and/or water-based coating compositions which crosslink at room temperature or at elevated temperature. This crosslinking may take place by components which are present in the coating composition or—particularly in the case of solvent-based systems—on exposure to atmospheric moisture.

Furthermore, however, it is also possible—as already observed above—for the first layer of the coating of the invention to be obtained from a coating composition having a solids fraction of 95 to 100 wt %, i.e. from what is called an ultra-high-solids coating composition. If the first layer of the coating of the invention is obtained by a coating composition having a solids fraction of 95 to 100 wt %, then the first layer comprises the inorganically based matrix customarily in amounts of 5 to 65 wt %, more particularly 5 to 50 wt %, preferably 10 to 30 wt %, more preferably 10 to 20 wt %, based on the first layer. In general, a coating composition having a solids fraction of 95 to 100 wt %, based on the composition, crosslinks on exposure to atmospheric moisture.

With regard now to the second layer of the coating of the invention, it is formed preferably in the form of an oxygen barrier coating.

In general the second layer of the coating of the invention has a layer thickness in the range from 0.1 to 50 µm, more particularly 0.5 to 40 µm, preferably 0.7 to 30 µm, more preferably 1 to 10 µm, very preferably 1 to 5 µm, especially preferably 1 to 3 µm.

The second layer of the coating of the invention, more particularly the oxygen barrier coating, may be composed of a multiplicity of materials. Thus for example it is possible for the second layer to be an oxygen barrier coating consisting solely of metals, more particularly an aluminium layer applied by hot-dip aluminizing.

In the context of the present invention, provision may also be made for the second layer of the coating of the invention to comprise an inorganically based matrix, more particularly a cured binder or a cured binder system. In the context of the present invention it has been found appropriate if the second layer comprises the inorganically based matrix in amounts of 50 to 100 wt %, more particularly 60 to 100 wt %, preferably 65 to 95 wt %, more preferably 70 to 85 wt %, based on the second layer. The second layer of the coating of the invention may consist entirely or almost entirely of the inorganically based matrix, i.e. of the set or crosslinked binder, and may therefore be present in the form of a clearcoat.

In general the inorganically based matrix of the second layer is formed by inorganic oxides, more particularly oxides of silicon, titanium and/or of zirconium, preferably by silicon dioxide and/or titanium dioxide, more preferably silicon dioxide. In this context provision may be made for joint use, for example, of mixed oxides and/or cocondensates of silicon-, titanium- and zirconium-containing precursor substances as well. It is preferred, however, if the inorganic oxide is silicon dioxide, which optionally includes small amounts of titanium dioxide.

According to one preferred embodiment of the present invention, the inorganically based matrix is organically modified. The organic modification of the inorganically based matrix results in turn in an increased flexibility of the second layer, more particularly of the oxygen barrier layer, and thus prevents flaking or delamination of the coating and also cracking within the coating.

In the context of the present invention, particularly good results are obtained if the binder is modified by means of organic radicals, in particular where the organic radicals are selected from alkyl, aryl and olefin radicals and also mixtures and reaction products thereof. In this context provision may be made for the organic radicals to be $C_1$ to $C_{10}$ alkyl radicals, more particularly $C_1$ to $C_5$ alkyl radicals, preferably $C_1$ to $C_3$ alkyl radicals, more preferably $C_1$ and/or $C_2$ alkyl radicals.

Provision may equally be made for the organic radicals to be $C_6$ to $C_{20}$ aryl radicals, more particularly $C_6$ to $C_{15}$ aryl radicals, preferably $C_6$ to $C_{10}$ aryl radicals.

It is possible, furthermore, for the organic radicals to be $C_2$ to $C_{10}$ olefin radicals, more particularly $C_2$ to $C_8$ olefin radicals, preferably $C_2$ to $C_5$ olefin radicals, more preferably $C_2$ and/or $C_3$ olefin radicals, very preferably vinyl radicals.

Particularly good results are obtained in the context of the present invention if the organic radicals are selected from methyl and/or ethyl radicals and also methylphenyl radicals.

In general the inorganically based matrix of the second layer is obtainable from silanes, polysilanes, silane hydrolysates, polysiloxanes, siliconates, silicates, titanates, polytitanates, zirconates and aluminium dihydrogen phosphate, more particularly silanes, silane hydrolysates and polysiloxanes, and also mixtures thereof. Inorganically based matrices based on silicon dioxide, in particular, exhibit high imperviousness towards gases at elevated temperatures as well as good flexibility of the coating.

The inorganically based matrix of the second layer may be obtained, like the inorganically based matrix of the first layer, by polymerization and condensation reactions of organic and inorganic groups.

According to one preferred embodiment of the present invention, the inorganically based matrix of the second layer is obtained by condensation reactions of inorganic groups. The inorganically based matrix of the second layer is therefore produced preferably by condensation reactions of inorganic hydroxides, which are obtained, for example, by hydrolysis of the corresponding alkoxy compounds. In this way, particularly resistant coatings are obtained which are also oxidation-resistant at elevated temperature. On linking of the individual molecules and/or particles of the coating composition via organic groups, at a high temperature, at least partial oxidation of the carbon chains is observed, leading to a deterioration in the corrosion control effect of the coating.

Furthermore, in the context of the present invention, very good results are obtained if the inorganically based matrix of the second layer has a carbon content of not more than 50 wt %, more particularly 40 wt %, preferably 35 wt %, more preferably 30 wt %, based on the inorganic matrix.

It is also preferred if the inorganically based matrix of the second layer has a carbon content in the range from 0.01 to 50 wt %, more particularly 0.05 to 40 wt %, preferably 0.1 to 35 wt %, more preferably 0.1 to 30 wt %, based on the inorganically based matrix.

A certain carbon fraction in the inorganically based matrix is often advantageous and also necessary in order to endow the coating—as already observed above—with the necessary flexibility, though it has emerged that too high a carbon fraction, particularly the use of relatively long-chain carbon radicals, leads to oxidation of the organic constituents at elevated temperatures, which weakens the structure of the coating and hence the corrosion control effect.

Completely carbon-free matrices having good mechanical properties can be obtained if the binder of the coating composition for the second layer is selected from polysilicates, more particularly waterglass, preferably sodium and/or potassium waterglass, or aluminium dihydrogen phosphate.

The inorganically based matrix of the second layer is also obtainable—like the first layer—from solvent-based and/or water-based coating compositions or from ultra-high-solids coating compositions having a solids content of 95 to 100 wt %, based on the coating composition.

As already elucidated, the second layer of the coating of the invention may also be formed without metal particles, i.e. in the form of a clearcoat, thereby achieving corrosion protection at high temperatures that is still a significant improvement on corrosion control coatings used in the prior art. The second layer may also be provided with inert ceramic or glass-based particles, especially flakes. It is possible to achieve further significant improvements in the temperature stability of the cathodic corrosion control, however, if the second layer comprises metal particles.

In the context of the present invention it is advantageous if the second layer comprises metal particles. In that case provision may be made for the second layer to comprise at least 5 wt %, more particularly at least 10 wt %, preferably at least 15 wt %, of metal particles, based on the second layer.

It is preferred if the second layer has a fraction of metal particles in the range from 5 to 50 wt %, more particularly 10 to 40 wt %, preferably 15 to 30 wt %, based on the second layer.

Particularly good results can also be obtained if the second layer comprises a fraction of metal particles in the range from 35 to 95 wt %, more particularly 45 to 80 wt %, preferably 55 to 70 wt %, based on the second layer.

If the second layer of the coating of the invention does comprise metal particles, these particles are customarily formed on the basis of zinc, aluminium and/or magnesium and also alloys thereof. Particularly preferred here is for the metal particles to be aluminium particles.

Provision may likewise be made for the second layer to comprise platelet-shaped and/or granular metal particles, more particularly spherical metal particles, preferably platelet-shaped metal particles. It has emerged that platelet-shaped metal particles, especially aluminium flakes, constitute an outstanding oxygen barrier and effectively prevent oxidation of the cathodic corrosion layer even at high temperatures.

In this context it has been found appropriate for the platelet-shaped metal particles to have a thickness of 10 to 1000 nm, more particularly 25 to 750 nm, preferably 40 to 600 nm, more preferably 50 to 500 nm.

It is equally preferred if the platelet-shaped metal particles have a diameter of 50 nm to 25 µm, more particularly 100 nm to 20 µm, preferably 250 nm to 15 µm, more preferably 500 nm to 10 µm, very preferably 1 to 8 µm, especially preferably 3 to 5 µm.

With regard, now, to the size of the metal particles used, it may vary within wide ranges. Particularly good results are obtained, however, if the platelet-shaped metal particles have a thickness of 50 to 1000 nm, more particularly 60 to 750 nm, preferably 80 to 600 nm, more preferably 100 to 500 nm.

It is equally advantageous if the platelet-shaped metal particles have a diameter of 1 µm to 25 µm, more particularly 2 µm to 20 µm, preferably 5 to 18 µm, more preferably 5 to 15 µm.

If the second layer of the coating of the invention is to comprise granular and/or spherical metal particles, these particles customarily have diameters in the range from 500 nm to 10 µm, more particularly 500 nm to 5 µm, preferably 500 nm to 3 µm.

Provision may further be made for the second layer to comprise further particles, more particularly fillers. If the second layer does comprise fillers, the amount thereof may vary within wide ranges. It has been found appropriate, however, for the second layer to comprise the fillers in amounts of 0.5 to 10 wt %, more particularly 1 to 8 wt %, preferably 2 to 5 wt %, based on the second layer.

The fillers in this context ought to be temperature-stable and oxidation-stable and also inert, meaning that they must not be reactive under application conditions with other constituents of the coating, of the substrate or of the surroundings, more particularly with atmospheric oxygen. Good results are obtained if the fillers are selected from tungsten carbide, boron nitride, glass particles, iron phosphide, zirconium dioxide, stainless steel and mixtures thereof.

In the drawings

Figure 2:
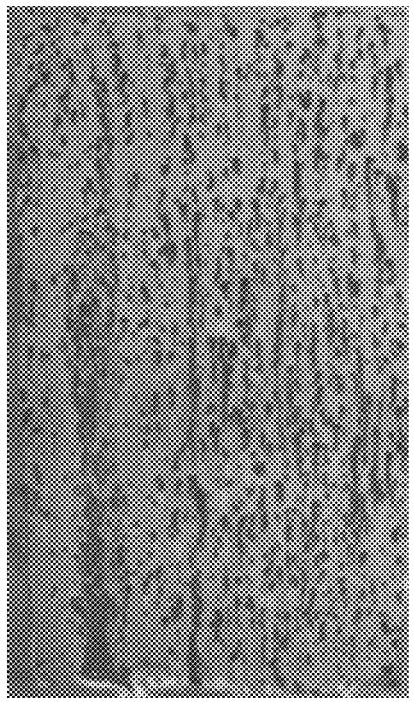
FIG. 2 shows a steel sheet provided with a cathodic corrosion control coating with lamellae on the basis of pure zinc, following implementation of a salt spray test with scribe mark according to DIN EN ISO 9227, after preceding temperature exposure at 400° C. for 48 hours.
Figure 3:
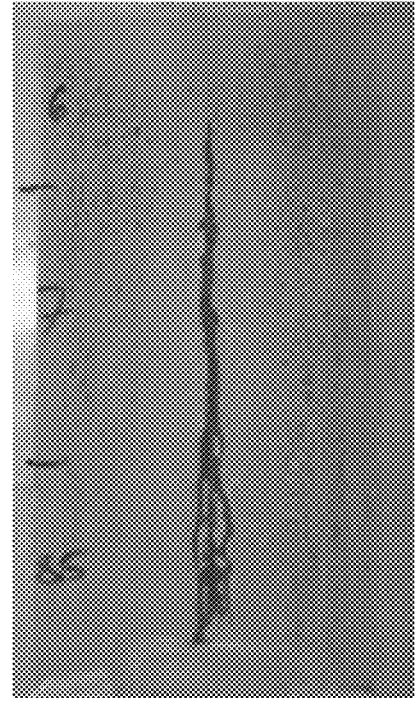
FIG. 3 shows a steel sheet provided with a cathodic corrosion control coating with lamellae on the basis of a zinc-aluminium-magnesium alloy, following implementation of a salt spray test with scribe mark according to DIN EN ISO 9227, after preceding temperature exposure at 400° C. for 48 hours.

FIG. 1 shows a metallic substrate 2 provided with a coating 1 of the invention;

FIG. 2 shows a steel sheet provided with a cathodic corrosion control coating with lamellae on the basis of pure zinc, following implementation of a salt spray test with scribe mark according to DIN EN ISO 9227, after preceding temperature exposure at 400° C. for 48 hours;

FIG. 3 shows a steel sheet provided with a cathodic corrosion control coating with lamellae on the basis of a zinc-aluminium-magnesium alloy, following implementation of a salt spray test with scribe mark according to DIN EN ISO 9227, after preceding temperature exposure at 400° C. for 48 hours;

FIG. 4 shows a steel substrate provided with cathodic corrosion control coating and oxygen barrier coating, following implementation of a salt spray test with scribe mark according to DIN EN ISO 9227, after preceding temperature exposure at 400° C. for 48 hours;

FIG. 5 shows a steel sheet provided with a cathodic corrosion control coating, following implementation of a salt spray test with scribe mark according to DIN EN ISO 9227, following temperature exposure of 500° C. over 48 hours; and FIG. 6 shows a steel sheet provided with a cathodic corrosion control coating and with an oxygen barrier coating, following implementation of a salt spray test with scribe mark according to DIN EN ISO 9227, following temperature exposure of 500° C. over 48 hours.

Further provided by the present invention—according to a second aspect of the present invention—is a coating composition for producing a cathodic corrosion control coating, more particularly with enhanced corrosion control after temperature exposure, comprising (a) at least one matrix former,
(b) metal particles and
(c) optionally additives and auxiliaries.

A matrix former here in the context of the present invention means the binder which comprises and encloses the metal particles and optionally further additives and auxiliaries and which on crosslinking and/or curing forms the solid matrix in which the metal particles and optionally further adjuvants are embedded. On curing and/or crosslinking of the coating composition for producing the cathodic corrosion control coating, the matrix former preferably forms the inorganically based matrix of the first layer of the coating of the invention.

For the purposes of the present invention, matrix formers should be taken to comprehend all constituents and/or compounds of the coating composition that form a part of the preferably inorganically based matrix. In particular here, in the context of the present invention, no distinction is made between binders and crosslinkers, since the applicant has discovered that typical crosslinkers for silane-based systems and/or polysiloxane-based systems, such as tetrabutyl titanate, for example, may also themselves be a principal constituent of the cured and/or crosslinked binder and/or of the inorganically based matrix. The matrix formers are therefore selected according to the criteria of the presence of a coating of maximum homogeneity with desired crosslinking and/or curing times.

Consequently, the major factor is to select matrix formers having reaction rates which are compatible with one another, in order to set the desired curing and crosslinking characteristics on the part of the matrix.

The coating composition of the invention is customarily in the form of a dispersion. A dispersion for the purposes of the present invention is any at least two-phase mixture, more particularly a homogeneous mixture, composed of a continuous phase, of the dispersion medium, and of a discontinuous phase, the dispersed substances, which is distributed finely and homogeneously in the dispersion medium.

In this context provision may be made for the composition to comprise organic solvents and/or water and/or for the composition to have a solids content of 95 to 100 wt %, based on the composition.

If the coating composition comprises organic solvents and/or water, then the coating composition comprises them customarily in amounts of from 0.5 to 60 wt %, more particularly 1 to 50 wt %, preferably 2 to 40 wt %, more preferably 5 to 30 wt %, based on the composition.

Organic solvents which can be used are all suitable organic solvents. Particularly suitable are aromatic and aliphatic hydrocarbons and also polar organic solvents, such as, for example, acetone, alcohols, especially $C_1$ to $C_{20}$ alcohols, preferably $C_2$ to $C_{10}$ alcohols, more preferably $C_2$ to $C_8$ alcohols, nitriles or nitro compounds, especially nitropropane.

The coating composition preferably comprises at least 30 wt %, more particularly at least 40 wt %, preferably at least 45 wt %, more preferably at least 50 wt %, of metal particles, based on the composition.

Equally it is preferred if the coating composition has a fraction of metal particles in the range from 35 to 95 wt %, more particularly 40 to 80 wt %, preferably 45 to 70 wt %, more preferably 50 to 60 wt %, based on the composition.

Moreover, in the context of the present invention, good results are obtained if at least some of the metal particles comprise zinc and/or zinc alloys.

According to one preferred embodiment of the present invention, the coating composition comprises platelet-shaped and/or granular, more particularly platelet-shaped, metal particles.

With regard now to the size of the metal particles used, it may vary within wide ranges. Particularly good results are obtained, however, if the platelet-shaped metal particles have a thickness of 50 to 1000 nm, more particularly 60 to 750 nm, preferably 80 to 600 nm, more preferably 100 to 500 nm.

Equally it is of advantage if the platelet-shaped metal particles have a diameter of 1 to 25 μm, more particularly 2 to 20 μm, preferably 5 to 18 μm, more preferably 5 to 15 μm.

If the coating composition of the invention does comprise granular metal particles, more particularly spherical metal particles, then it is preferred in the context of the present invention if the granular, more particularly spherical, metal particles have particle diameters in the range from 500 nm to 20 μm, more particularly 500 nm to 10 μm, preferably 500 nm to 5 μm.

Provision may further be made for the composition to comprise at least one filler, more particularly an inert filler, in amounts of 0.1 to 10 wt %, more particularly 0.5 to 8 wt %, preferably 0.5 to 5 wt %, based on the composition. Employed in particular in the coating composition are the fillers recited above with the first layer of the coating of the invention.

With regard now to the matrix former for producing the inorganically based matrix, it is customarily selected from silanes, polysilanes, silane hydrolysates, polysiloxanes, siliconates, polysilicates, titanates, polytitanates and zirconates, more particularly silanes, silane hydrolysates, polysiloxanes, titanates and polytitanates, and also mixtures thereof.

For the purposes of the present invention it is preferred, moreover, if the matrix former is organically modified.

In the context of the present invention, provision may further be made for the matrix former to crosslink and/or cure through condensation reactions of organic and/or inorganic groups. Provision may also be made for the matrix former to crosslink and/or cure through polymerization reactions of organic groups. It is, however, preferred in the context of the present invention if the matrix former crosslinks and/or cures through condensation reactions, particularly of inorganic groups, as described above.

Particularly good results are obtained in the context of the present invention if the matrix former is in particular at least partly modified with organic radicals. In this context it has proven appropriate if the organic radicals are selected from alkyl, aryl and olefin radicals.

If the matrix former contains alkyl radicals, they are customarily selected from $C_1$ to $C_{10}$ alkyl radicals, more particularly $C_1$ to $C_5$ alkyl radicals, preferably $C_1$ to $C_3$ alkyl radicals, more preferably $C_1$ and/or $C_2$ alkyl radicals.

If the matrix former contains aryl radicals, they are customarily selected from $C_6$ to $C_{20}$ aryl radicals, more particularly $C_6$ to $C_{15}$ aryl radicals, preferably $C_6$ to $C_{10}$ aryl radicals.

If the matrix former contains olefin radicals, they are customarily selected from $C_2$ to $C_{10}$ olefin radicals, more particularly $C_2$ to $C_8$ olefin radicals, preferably $C_2$ to $C_5$ olefin radicals, more preferably $C_2$ and/or $C_3$ olefin radicals, very preferably vinyl radicals.

Particularly good results are obtained in the context of the present invention if the matrix former comprises methyl and/or ethyl radicals and/or vinyl radicals.

Provision may be made, moreover, in the context of the present invention for the organic radicals additionally to have polar chemical groups, selected more particularly from hydroxyl, ethers, thiols, amines, aldehydes, ketones and/or carboxylic acids, preferably hydroxyl, ethers, amines and/or carboxylic acids.

According to one preferred embodiment of the present invention the matrix former is selected from silanes of the general formula I $$R_{4-n}SiX_n \qquad (I)$$

where
R=alkyl, more particularly $C_1$ to $C_5$ alkyl, preferably $C_1$ to $C_3$ alkyl, more preferably $C_1$ and/or $C_2$ alkyl;
   aryl, more particularly $C_6$ to $C_{20}$ aryl, preferably $C_6$ to $C_{15}$ aryl, more preferably $C_6$ to $C_{10}$ aryl;
   olefin, more particularly terminal olefin, preferably $C_2$ to $C_{10}$ olefin, more preferably $C_2$ to $C_8$ olefin, very preferably $C_2$ to $C_5$ olefin, especially preferably $C_2$ and/or $C_3$ olefin, with more particular preference vinyl;
   amine, more particularly $C_2$ to $C_{10}$ amine, preferably $C_2$ to $C_8$ amine, more preferably $C_2$ to $C_5$ amine, very preferably $C_2$ and/or $C_3$ amine;
   carboxylic acid, more particularly $C_2$ to $C_{10}$ carboxylic acid, preferably $C_2$ to $C_8$ carboxylic acid, more preferably $C_2$ to $C_5$ carboxylic acid, very preferably $C_2$ and/or $C_3$ carboxylic acid;
   alcohol, more particularly $C_2$ to $C_{10}$ alcohol, preferably $C_2$ to $C_8$ alcohol, more preferably $C_2$ to $C_5$ alcohol, very preferably $C_2$ and/or $C_3$ alcohol;
X=halide, more particularly chloride and/or bromide;
   alkoxy, more particularly $C_1$ to $C_6$ alkoxy, very preferably $C_1$ to $C_4$ alkoxy, especially preferably $C_1$ and/or $C_2$ alkoxy; and
n=1-4, preferably 2 or 3.

In this context it has been found appropriate for the matrix former to be selected from silanes of the general formula Ia $$R_{4-n}SiX_n \qquad (Ia)$$

where
R=$C_1$ to $C_3$ alkyl, especially $C_1$ and/or $C_2$ alkyl;
   $C_6$ to $C_{15}$ aryl, especially $C_6$ to $C_{10}$ aryl;
   $C_2$ and/or $C_3$ olefin, especially vinyl;
X=alkoxy, especially $C_1$ to $C_6$ alkoxy, more preferably $C_1$ to $C_4$ alkoxy, very preferably $C_1$ and/or $C_2$ alkoxy; and
n=2 or 3.

Particularly good results are obtained in the context of the present invention if the matrix former is selected from alkylsilanes, more particularly trialkoxyalkylsilanes, dialkoxydialkylsilanes and/or alkoxytrialkylsilanes, and/or from vinylsilanes, more particularly trialkoxyvinylsilanes, dialkoxydivinyl-silanes and/or alkoxytrivinylsilanes. This is true especially of silanes according to the general formulae I and Ia.

Equally it is preferred in the context of the present invention if the matrix former is selected from silane hydrolysates, polysiloxanes, especially alkyl polysiloxanes, preferably $C_1$ to $C_3$ alkylpolysiloxanes and/or $C_1$ to $C_3$ alkoxyalkylpolysiloxanes, and/or from vinylpolysiloxanes, and from polytitanates. Particularly good results are obtained in this context if the matrix former has a weight-average molecular weight $M_w$ in the range from 200 to 200 000 g/mol, more particularly 500 to 150 000 g/mol, preferably 1000 to 100 000 g/mol, more preferably 2000 to 75000 g/mol, very preferably 5000 to 50000 g/mol.

Furthermore, in the context of the present invention, good results are obtained if the matrix former is selected from titanates of the general formula II $$TiX_4 \qquad (II)$$

where
X=halide, especially chloride and/or bromide;
   alkoxy, especially $C_1$ to $C_8$ alkoxy, preferably $C_1$ to $C_6$ alkoxy, more preferably $C_1$ to $C_4$ alkoxy.

In this context it has proven appropriate if the matrix former is selected from titanates of the general formula IIa $$TiX_4 \qquad (IIa)$$

where
X=alkoxy, especially $C_1$ to $C_8$ alkoxy, preferably $C_1$ to $C_6$ alkoxy, more preferably $C_1$ to $C_4$ alkoxy.

Furthermore, it is equally possible for the matrix former to be selected from zirconates of the general formula III $$ZrX_4 \qquad (III)$$

where
X=halide, especially chloride and/or bromide;
   alkoxy, especially $C_1$ to $C_8$ alkoxy, preferably $C_1$ to $C_6$ alkoxy, more preferably $C_1$ to $C_4$ alkoxy.

Particularly good results are obtained here if the matrix former is selected from zirconates of the general formula IIIa $$ZrX_4 \qquad (IIIa)$$

where
X=alkoxy, especially $C_1$ to $C_8$ alkoxy, preferably $C_1$ to $C_6$ alkoxy, more preferably $C_1$ to $C_4$ alkoxy.

Furthermore, in the context of the present invention, it is possible to use a siliconate as matrix former. Particularly good results in this case are obtained if a siliconate of the general formula IV is used

$$HO\text{—}[Si(R)(OM)\text{-}O\text{—}]_nH \qquad (IV)$$

where
n=1 to 6, especially 1 to 3, preferably 1;
R=$C_1$ to $C_{10}$ alkyl and/or $C_6$ to $C_{15}$ aryl,
  especially $C_1$ to $C_8$ alkyl and/or $C_6$ to $C_{12}$ aryl,
  preferably $C_1$ to $C_6$ alkyl and/or $C_6$ to $C_{10}$ aryl,
  more preferably $C_1$ to $C_4$ alkyl,
  very preferably $C_1$ to $C_3$ alkyl;
M=monovalent metal,
  especially alkali metal, preferably sodium or potassium.

In this context it has proven appropriate for the siliconate to be selected from sodium methylsiliconate, potassium methylsiliconate, sodium propylsiliconate and potassium propylsiliconate.

It is possible, furthermore, for the matrix former to be selected from silicon dioxide, more particularly silica, titanium dioxide and/or zirconium oxide. If the coating composition comprises silicon dioxide, titanium dioxide and/or zirconium oxide as matrix formers, they are present customarily in the form of particles in the coating composition, and more particularly in only small amounts, more particularly in amounts of 0.1 to 10 wt %, preferably 0.2 to 5 wt %, more preferably 0.5 to 2 wt %, based on the coating composition.

In the context of the present invention, particularly good results are obtained if the coating composition comprises at least two different matrix formers, especially two reactive matrix formers. A reactive matrix former for the purposes of the invention is therefore a matrix former which possesses reactive functional chemical groups. These may be hydrolysable groups or polymerizable groups, for example. The functional chemical groups must allow a reaction to take place with other matrix former molecules or matrix former particles under the conditions of crosslinking. The reactivities of the respective matrix formers should be selected such that uniform crosslinking takes place, allowing homogeneous incorporation of metal particles and other additives.

Particularly good results are obtained in the context of the present invention if the coating composition comprises at least one matrix former based on a silicon compound and one matrix former based on a titanium compound.

Customarily the composition comprises the matrix former in amounts of 1 to 45 wt %, more particularly 2 to 40 wt %, preferably 5 to 30 wt %, more preferably 5 to 20 wt %, based on composition.

Provision may further be made for the composition to comprise at least one organic polymer, more particularly an inert polymer, preferably an organofluorine polymer.

If the composition does comprise an organic polymer, it comprises the polymer in amounts of 0.1 to 10 wt %, more particularly 0.2 to 5 wt %, preferably 0.5 to 1 wt %, based on the composition.

Particularly good results are obtained here if the organic polymer is selected from polytetrafluoroethene, polyvinyl fluoride, polyvinylidene fluoride, preferably polyvinylidene fluoride.

With regard now to the viscosity of the coating composition of the invention, it may vary within wide ranges. It has been found appropriate, however, if the composition has a dynamic viscosity by the Brookfield method at 20° C. in the range from 1 to 50000 mPas, more particularly 2 to 10000 mPas, preferably 5 to 1000 mPas, more preferably 5 to 500 mPas, very preferably 10 to 100 mPas.

For the purposes of the present invention provision may be made, furthermore, for the coating composition to comprise further additives and/or auxiliaries. If the coating composition of the invention for producing a cathodic corrosion control layer does comprise other additives and/or auxiliaries, they are customarily selected from the group of rheological additives, preservatives, stabilizers, acids and/or bases, surfactants, defoaming components, film formers, waxes, active biogenic ingredients, pH stabilizers and pH modifiers.

In the context of the present invention, provision may be made for the composition to be crosslinked and/or cured at elevated temperature and/or by irradiation, more particularly at elevated temperature. With regard to the temperatures at which the composition crosslinks and/or cures, they may vary within wide ranges. It has nevertheless proved to be appropriate for the composition to crosslink and/or cure at temperatures in the range from 30 to 350° C., preferably 50 to 300° C., more preferably 100 to 250° C., very preferably 100 to 200° C. Customarily the composition, particularly the matrix former, crosslinks and/or cures within a period of 1 minute to 2 hours, more particularly 2 minutes to 1 hour, preferably 3 to 30 minutes, more preferably 4 to 20 minutes, very preferably 5 to 15 minutes. At elevated temperature the coating compositions of the invention cure within a very short time, and so high throughputs are possible in industrial production, for example.

According to a further embodiment of the present invention, the composition, more particularly the matrix former, crosslinks and/or cures at room temperature. Systems which cure at room temperature are outstandingly suitable for substrates which on account of their size cannot be heated and/or irradiated, such as industrial plant and/or parts of steel constructions, for example. The coatings and coating compositions of the invention are suitable in this context in particular for renewing the corrosion protection on existing installations and constructions as well.

If the composition and/or the matrix former crosslinks and/or cures at room temperature, then the composition, more particularly the matrix former, crosslinks and/or cures preferably in a period of 1 minute to 2 hours, more particularly 2 minutes to 1 hour, preferably 3 to 45 minutes, more preferably 5 to 30 minutes.

In the case of the compositions, especially matrix formers, that crosslink at room temperature, provision may additionally be made for the crosslinking to be initiated by atmospheric moisture.

According to one particular embodiment of the present invention, the coating composition has a solids fraction of 95 to 100 wt %, based on the composition. In accordance with this embodiment, the coating composition of the invention is in the form of a solvent-free and/or water-free, or low-solvent and/or low-water, ultra-high-solids coating composition. The coating compositions of the invention with a solids fraction of 95 to 100 wt %, based on the composition, cure preferably at room temperature and/or on exposure to atmospheric moisture. The complete absence of solvents is preferred from the standpoint of environmental protection on the one hand and its statutory impositions on the other.

Customarily the coating composition of the invention with a solids fraction of 95 to 100 wt %, based on the composition, is in liquid form and undergoes full curing and/or crosslinking. It can therefore be processed like water-based and solvent-based systems, in particular also by spray application. In terms of its viscosity it corresponds to the solvent-based and water-based systems. Particularly suitable matrix formers of the ultra-high-solids coating compositions are alkylpolysiloxane resins, more particularly alkoxyalkylsiloxane resins, more particularly having the above-stated average weight-based molecular weights $M_w$.

If the coating composition of the invention for producing a cathodic corrosion control layer is in the form of a coating composition having a solids fraction of 95 to 100 wt %, based on the composition, then particularly good results are obtained if the composition comprises at least 35 wt %, more particularly at least 50 wt %, preferably at least 70 wt %, more preferably at least 80 wt %, of metal particles, based on the composition.

It has equally proven suitable for the composition to have a fraction of metal particles in the range from 35 to 95 wt %, more particularly 50 to 95 wt %, preferably 70 to 90 wt %, more preferably 80 to 90 wt %, based on the composition.

In accordance with this particular embodiment, it is preferred if the composition comprises granular, more particularly spherical, metal particles in amounts of 35 to 95 wt %, more particularly 50 to 90 wt %, preferably 70 to 90 wt %, more preferably 80 to 90 wt %, based on the coating composition. In this context it is preferred if the metal particles are formed on the basis of zinc or zinc alloys, preferably elemental zinc.

Furthermore, in accordance with this embodiment, provision may be made for the coating composition to comprise platelet-shaped metal particles, more particularly zinc lamellae in amounts of 0.1 to 50 wt %, more particularly 0.2 to 25 wt %, preferably 0.3 to 10 wt %, more preferably 0.5 to 5 wt %, based on the composition. In this context it has proved to be advantageous if the platelet-shaped metal particles are formed on the basis of zinc or zinc alloys, preferably elemental zinc.

In accordance with this embodiment, furthermore, provision is generally made for the composition to comprise the matrix former in amounts of 5 to 65 wt %, more particularly 5 to 50 wt %, preferably 10 to 30 wt %, more preferably 10 to 20 wt %, based on the composition. For further details regarding the coating composition of the invention for producing a cathodic corrosion control coating, reference may be made to the observations above concerning the coating of the invention, which apply correspondingly in relation to the coating composition of the invention for producing a cathodic corrosion control coating.

Yet further provided for the present invention—according to a third aspect of the present invention—is a coating composition for producing an oxygen barrier coating, comprising an inorganically based matrix former and optionally auxiliaries and additives.

In general the coating composition is applied with a layer thickness in the range from 0.1 to 60 μm, more particularly 0.5 to 50 μm, preferably 0.7 to 35 μm, more preferably 1 to 10 μm, very preferably 1 to 5 μm, especially preferably 1 to 3 μm, to a substrate.

The coating composition customarily takes the form of a dispersion.

In this context provision may be made for the composition to comprise organic solvents and/or water and/or for the composition to take the form of a coating composition having a solids fraction of 95 to 100 wt %, based on the composition. Organic solvents contemplated are all suitable solvents, especially those mentioned in connection with the coating composition for producing a cathodic corrosion control layer.

The second coating composition preferably takes the form of a water-based system or of a system having a solids content of 95 to 100 wt %, based on the composition, preferably in the form of a water-based system. Water-based systems are gentle on the environment, and no costly and inconvenient apparatus need be provided for collecting and/or recovering the organic solvents. Furthermore, the use of water-based systems also allows the coating composition to be used broadly against the background of workplace safety, since there is no fire risk and no emanation of organic solvents harmful to health into the surroundings, particularly the inspired air.

If the coating composition comprises organic solvents and/or water, then the coating composition comprises organic solvents and/or water in amounts of 30 to 90 wt %, more particularly 40 to 80 wt %, preferably 50 to 75 wt %, based on the coating composition. The best results, particularly with regard to the temperature stability of the resultant coating, are obtained, however, with water-based systems, particularly if the coating composition does not contain more than 10 wt %, more particularly not more than 5 wt %, preferably not more than 3 wt %, more preferably not more than 1 wt %, of organic solvents, based on the coating composition.

With regard to the viscosity of the coating composition of the invention, it can of course vary within wide ranges. Particularly good results, however, are achieved if the coating composition has a dynamic viscosity by the Brookfield method at 20° C. in the range from 1 to 50000 mPas, more particularly 2 to 10000 mPas, preferably 5 to 1000 mPas, more preferably 5 to 500 mPas, very preferably 10 to 100 mPas.

Furthermore, provision may be made in the context of the present invention for the coating composition to comprise the matrix former in amounts of 10 to 100 wt %, more particularly 15 to 90 wt %, preferably 20 to 80 wt %, more preferably 25 to 70 wt %, very preferably 20 to 60 wt %, based on the composition.

According to one preferred embodiment of the present invention, the matrix former is selected from silanes, polysilanes, silane hydrolysates, polysiloxanes, siliconates, silicates, titanates, polytitanates and zirconates, more particularly silanes, silane hydrolysates, polysiloxanes and silicates, and also mixtures thereof. The aforementioned matrix formers react to give the corresponding inorganic oxides, more particularly the oxides of silicon, of titanium and/or of zirconium, with silicon-based reagents being preferred in the context of the formation of the gas corrosion layer.

According to one preferred embodiment, the matrix former of the coating composition is organically modified in order to produce an oxygen barrier layer 1.

In general the matrix former of the coating composition for producing an oxygen barrier layer crosslinks and/or cures through condensation reactions of inorganic and/or organic groups and/or through polymerization reaction of organic chemical groups. It is preferred, however, if the matrix former crosslinks and/or cures through condensation reactions of inorganic groups. In this way, particularly resistant, gas-tight and, in particular, oxidation-stable oxygen barrier layers are accessible. A certain, small organic modification of the matrix formers is nevertheless an advantage, since the organic groups tend to give the coating more flexibility.

In the context of the present invention it is therefore preferred if the matrix former is modified by organic radicals. Advantageously in this case the organic radicals are selected from alkyl, aryl and olefin radicals, more particularly alkyl and aryl radicals, and also mixtures thereof.

If the coating composition for producing a gas corrosion layer comprises alkyl radicals, it has proved appropriate for the alkyl radicals to be $C_1$ to $C_{10}$ alkyl radicals, more particularly $C_1$ to $C_5$ alkyl radicals, preferably $C_1$ to $C_3$ alkyl radicals, more preferably $C_1$ and/or $C_2$ alkyl radicals.

Equally it is of advantage if the aryl radicals are $C_6$ to $C_{20}$ aryl radicals, more particularly $C_6$ to $C_{15}$ aryl radicals, preferably $C_6$ to $C_{10}$ aryl radicals.

Provision may also be made, furthermore, for the olefin radicals to be $C_2$ to $C_{10}$ olefin radicals, more particularly $C_2$ to $C_8$ olefin radicals, preferably $C_2$ to $C_5$ olefin radicals, more preferably $C_2$ and/or $C_3$ olefin radicals, very preferably vinyl radicals.

It has proved to be particularly favourable in the context of the present invention, however, if the organic radicals are methyl and/or ethyl radicals and/or methylphenyl radicals.

In the context of the present invention, good results are obtained if the matrix former is selected from silanes of the general formula I $$R_{4-n}SiX_n \quad (I)$$

where
R=alkyl, more particularly $C_1$ to $C_5$ alkyl, preferably $C_1$ to $C_3$ alkyl, more preferably $C_1$ and/or $C_2$ alkyl;
aryl, more particularly $C_6$ to $C_{20}$ aryl, preferably $C_6$ to $C_{15}$ aryl, more preferably $C_6$ to $C_{10}$ aryl;
olefin, more particularly terminal olefin, preferably $C_2$ to $C_{10}$ olefin, more preferably $C_2$ to $C_8$ olefin, very preferably $C_2$ to $C_5$ olefin, especially preferably $C_2$ and/or $C_3$ olefin, with more particular preference vinyl;
amine, more particularly $C_2$ to $C_{10}$ amine, preferably $C_2$ to $C_8$ amine, more preferably $C_2$ to $C_5$ amine, very preferably $C_2$ and/or $C_3$ amine;
carboxylic acid, more particularly $C_2$ to $C_{10}$ carboxylic acid, preferably $C_2$ to $C_8$ carboxylic acid, more preferably $C_2$ to $C_5$ carboxylic acid, very preferably $C_2$ and/or $C_3$ carboxylic acid;
alcohol, more particularly $C_2$ to $C_{10}$ alcohol, preferably $C_2$ to $C_8$ alcohol, more preferably $C_2$ to $C_5$ alcohol, very preferably $C_2$ and/or $C_3$ alcohol;
X=halide, more particularly chloride and/or bromide;
alkoxy, more particularly $C_1$ to $C_6$ alkoxy, very preferably $C_1$ to $C_4$ alkoxy, especially preferably $C_1$ and/or $C_2$ alkoxy; and
n=1 to 4, preferably 2 or 3.

In the context of the present invention, good results are obtained if the matrix former is selected from silanes of the general formula Ia $$R_{4-n}SiX_n \quad (Ia)$$

where
R=$C_1$ to $C_3$ alkyl, especially $C_1$ and/or $C_2$ alkyl;
$C_6$ to $C_{15}$ aryl, especially $C_6$ to $C_{10}$ aryl;
$C_2$ and/or $C_3$ olefin, especially vinyl;
X=alkoxy, especially $C_1$ to $C_6$ alkoxy, more preferably $C_1$ to $C_4$ alkoxy, very preferably $C_1$ and/or $C_2$ alkoxy; and
n=2 or 3.

The matrix former of the coating composition preferably comprises alkylsilanes, more particularly trialkoxyalkylsilanes, dialkoxydialkylsilanes and/or alkoxytrialkylsilanes, and/or arylsilanes, more particularly trialkoxyarylsilanes, dialkoxydiarylsilanes and/or alkoxytriarylsilanes.

In the context of the present invention, very good results are obtained if the matrix former is selected from silane hydrolysates, polysiloxanes, more particularly alkylpolysiloxanes, preferably $C_1$ to $C_3$ alkylpolysiloxanes and/or $C_1$ to $C_3$ alkoxyalkylpolysiloxanes, and/or arylpolysiloxanes, preferably $C_6$ to $C_{10}$ arylpolysiloxanes and $C_6$ to $C_{10}$ alkoxyarylpolysiloxanes. In this context it is preferred if the matrix former has a weight-average molecular weight $M_w$ in the range from 200 to 200 000 g/mol, more particularly 500 to 150 000 g/mol, preferably 1000 to 100000 g/mol, more preferably 2000 to 75000 g/mol, very preferably 5000 to 50000 g/mol.

In this context it has proved appropriate if the coating composition comprises, as matrix formers, alkoxymethyl-silicone resins and/or alkoxymethylphenyl-silicone resins.

Furthermore, provision may be made for the matrix former to be selected from titanates of the general formula II $$TiX_4 \quad (II)$$

where
X=halide, especially chloride and/or bromide;
alkoxy, especially $C_1$ to $C_8$ alkoxy, preferably $C_1$ to $C_6$ alkoxy, more preferably $C_1$ to $C_4$ alkoxy.

In this context it has proven appropriate if the matrix former is selected from titanates of the general formula IIa $$TiX_4 \quad (IIa)$$

where
X=alkoxy, especially $C_1$ to $C_8$ alkoxy, preferably $C_1$ to $C_6$ alkoxy, more preferably $C_1$ to $C_4$ alkoxy.

Equally provision may be made for the matrix former to be selected from zirconates of the general formula III $$ZrX_4 \quad (III)$$

where
X=halide, especially chloride and/or bromide;
alkoxy, especially $C_1$ to $C_8$ alkoxy, preferably $C_1$ to $C_6$ alkoxy, more preferably $C_1$ to $C_4$ alkoxy.

Particularly good results are obtained here if the matrix former is selected from zirconates of the general formula IIIa $$ZrX_4 \quad (IIIa)$$

where
X=alkoxy, especially $C_1$ to $C_8$ alkoxy, preferably $C_1$ to $C_6$ alkoxy, more preferably $C_1$ to $C_4$ alkoxy.

Furthermore, in the context of the present invention, it is possible to use a siliconate as matrix former. Particularly good results in this case are obtained if a siliconate of the general formula IV is used $$HO-[Si(R)(OM)-O-]_nH \quad (IV)$$

where
n=1 to 6, especially 1 to 3, preferably 1;
R=$C_1$ to $C_{10}$ alkyl and/or $C_6$ to $C_{15}$ aryl,
especially $C_1$ to $C_8$ alkyl and/or $C_6$ to $C_{12}$ aryl,
preferably $C_1$ to $C_6$ alkyl and/or $C_6$ to $C_{10}$ aryl,
more preferably $C_1$ to $C_4$ alkyl,
very preferably $C_1$ to $C_3$ alkyl;
M=monovalent metal,
especially alkali metal, preferably sodium or potassium.

In this context it has proven appropriate for the siliconate to be selected from sodium methylsiliconate, potassium methylsiliconate, sodium propylsiliconate and potassium propylsiliconate.

It is also possible for the matrix former to be selected from polysilicates, more particularly waterglass, preferably sodium and/or potassium waterglass, or aluminium dihydrogenphosphate. With the aforementioned matrix formers, entirely carbon-free matrices can be obtained, having good mechanical properties.

Provision may equally be made for the matrix former to be selected from silica, titanium dioxide and zirconium oxide, these matrix formers being customarily in particle form and being used in particular in small amounts, preferably in amounts of 0.1 to 10 wt %, more preferably 1 to 5 wt %, based on the coating composition. If silica, titanium dioxide and/or zirconium oxide are used as matrix formers, the coating composition customarily comprises at least one further matrix former in order to ensure the necessary cohesion of the coating.

In the context of the present invention it is possible for the coating composition to comprise a plurality of different matrix formers, more particularly reactive matrix formers. Particularly good results in this context are obtained if the coating composition comprises exclusively silicon-based matrix formers.

According to one preferred embodiment of the present invention, the coating composition comprises metal particles.

One preferred coating composition accordingly comprises
(a) at least one inorganically based matrix former,
(b) metal particles and
(c) optionally auxiliaries and additives.

If the coating composition of the invention for producing a gas corrosion layer does comprise metal particles, the amount thereof may vary within wide ranges. It has proved appropriate, however, if the second coating composition comprises at least 1 wt %, more particularly at least 2 wt %, preferably at least 5 wt % of metal particles, based on the composition.

Particularly good results are also obtained if the second coating composition comprises a fraction of metal particles in the range from 1 to 50 wt %, more particularly 2 to 30 wt %, preferably 5 to 20 wt %, more preferably 5 to 15 wt %, based on the composition.

In this context, provision may be made in particular for the composition to comprise platelet-shaped and/or granular, more particularly spherical, metal particles, preferably platelet-shaped metal particles, more particularly as described above.

Particularly good results are obtained in the context of the present invention if the composition comprises platelet-shaped metal particles based on zinc, aluminium and/or magnesium and also their alloys, preferably platelet-shaped aluminium particles.

In general it is provided that the additives and/or auxiliaries in the coating composition are selected from the group of rheological additives, preservatives, stabilizers, acids and/or bases, surfactants, defoaming components, film formers, waxes, organic UV absorbers, active biogenic ingredients, flow control agents, dispersing assistants, emulsifiers, wetting agents, fillers, pH stabilizers and pH modifiers.

In the context of the present invention, furthermore, provision may be made for the composition to crosslink and/or cure at elevated temperature and/or by irradiation, preferably at elevated temperature. If the composition crosslinks at elevated temperature, the temperature at which the composition crosslinks and/or cures may vary within wide ranges. Particularly good results, however, are obtained if the composition cures and/or crosslinks at temperatures in the range of from 10 to 250° C., preferably 15 to 150° C., more preferably 20 to 100° C. In the context of the present invention it is therefore possible to provide systems which cure and/or crosslink at room temperature, more particularly in the temperature range from 20 to 30° C. An advantage possessed by systems which cure and/or crosslink at room temperature is that no special equipment or apparatus is needed for the curing and/or crosslinking of the coating composition.

If the composition does crosslink and/or cure at elevated temperature, then the composition crosslinks and/or cures customarily within a period of one minute to 2 hours, more particularly 2 minutes to 1 hour, preferably 3 to minutes, more preferably 4 to 20 minutes, very preferably 5 to 15 minutes.

Provision may equally be made, however, for the composition to cure and/or crosslink at room temperature. This embodiment is of advantage in particular if the coated substrates on account of their size cannot be brought into an oven or heated by means of a radiant heater. Equally it is possible to save larger amounts of energy.

If the composition crosslinks and/or cures at room temperature, then the composition crosslinks and/or cures customarily within a period of 1 minute to 2 hours, more particularly 2 minutes to 1 hour, preferably 3 to 45 minutes, more preferably 5 to 30 minutes.

For the purposes of the present invention, water-based coating compositions which crosslink at room temperature are preferred for the production of the gas corrosion layer.

According to one particular embodiment of the present invention, the coating composition for producing a gas corrosion layer has a solids fraction of 95 to 100 wt %, based on the composition. According to this particular embodiment, the coating composition of the invention is formed as a solvent-free or low-solvent ultra-high-solids coating composition. The coating composition with a solids fraction of 95 to 100 wt %, based on the composition, crosslink customarily with exposure to atmospheric moisture as initiator.

As already observed above, in the context of the present invention, coating compositions having a solids fraction of 95 to 100 wt % are advantageously liquid in form and in their viscosity are no different from water-based and/or solvent-based systems. To adjust the viscosity, the coating composition with a solids fraction of 95 to 100 wt % may, however, include up to 5 wt % of solvents or water.

In the context of the present invention it has been found appropriate if, in accordance with this particular embodiment, the coating composition comprises the matrix former in amounts of 50 to 100 wt %, more particularly 60 to 100 wt %, preferably 70 to 95 wt %, more preferably 75 to 90 wt %, based on the coating composition.

In accordance with this embodiment, provision may also be made for the coating composition to comprise at least 5 wt %, more particularly at least 10 wt %, preferably at least 15 wt %, of metal particles, based on the coating composition.

Furthermore, good results are obtained in accordance with this particular embodiment if the coating composition comprises a fraction of metal particles in the range from 5 to 50 wt %, more particularly 10 to 30 wt %, preferably 15 to 25 wt %, based on the coating composition.

For further details regarding this aspect of the invention, reference may be made to the observations concerning the other aspects of the invention, which apply correspondingly in relation to the coating composition of the invention for producing a gas corrosion layer.

Yet further provided for the present invention—according to a fourth aspect of the present invention—is a method for producing a high-temperature corrosion control coating on a metallic substrate, where
(A) in a first method step, a corrosion control coating and/or coating composition for producing a cathodic corrosion control coating is applied to the metallic substrate, to give a cathodic corrosion control layer, and (B) in a subsequent second method step, a second corrosion control coating and/or coating composition for producing an oxygen barrier layer is applied to the substrate, more particularly to the first corrosion control layer, to give an oxygen barrier layer.

The method of the invention is customarily carried out such that in method step (A), the corrosion control coating and/or the coating composition is applied with a layer thickness in the range from 0.1 to 180 µm, more particularly 0.5 to 150 µm, preferably 1 to 140 µm, more preferably 2 to 90 µm, very preferably 3 to 40 µm, to the substrate.

If the coating composition in method step (A) is applied in the form of a zinc flake coating on the substrate, then the coating customarily has layer thicknesses in the range from 0.1 to 25 µm, more particularly 1 to 15 µm, preferably 2 to 10 µm, more preferably 4 to 8 µm.

For the purposes of the present invention it is possible in method step (A) for a layer of metallic zinc to be applied as a cathodic corrosion layer to the substrate, in particular by hot-dip galvanizing or electrogalvanizing.

According to one preferred embodiment of the present invention, in method step (A), a first coating composition comprising metal particles, more particularly as described above, is applied to the substrate in order to generate the cathodic corrosion control layer, and is subsequently crosslinked and/or cured.

With regard now to the actual coating operation in method step (A), it may be performed in a variety of ways. In the context of the present invention, however, it has proved advantageous if in method step (A) the corrosion control coating and/or the coating composition is applied to the substrate by spraying, dipping, spin coating, dip-spin coating, knife coating or rolling, more particularly by means of spraying, dipping, spin coating or dip-spin coating, preferably by means of spraying. Spraying is suitable especially outstandingly with relatively large objects, whereas for relatively small objects, such as screws, for example, preference is given to dip-spin coating, since dip-spin coating allows a multiplicity of substrates for coating to be coated simultaneously.

In the context of the present invention, provision may be made for the coating composition in method step (A) to be cured or crosslinked at room temperature. If the coating composition is crosslinked and/or cured at room temperature, this is done customarily within the time periods identified above.

It is equally possible as well, however, for the coating composition in method step (A) to be crosslinked and/or cured at elevated temperature and/or by irradiation, preferably at elevated temperature. In this context it has proved advantageous if the coating composition is crosslinked and/or cured at temperatures in the range from 30 to 350° C., preferably 50 to 300° C., more preferably 100 to 250° C., very preferably 150 to 200° C.

If the coating composition is crosslinked and/or cured at elevated temperature, this is done customarily within the time periods identified above.

In the context of the present invention, method step (B) is customarily carried out by the corrosion control coating and/or the coating composition being applied with a layer thickness in the range from 0.1 to 60 µm, more particularly 0.5 to 50 µm, preferably 0.7 to 35 µm, more preferably 1 to 10 µm, very preferably 1 to 5 µm, especially preferably 1 to 3 µm, to the substrate.

In general the second layer of the coating of the invention has a layer thickness in the range from 0.1 to 50 µm, more particularly 0.5 to 40 µm, preferably 0.7 to 30 µm, more preferably 1 to 10 µm, very preferably 1 to 5 µm, especially preferably 1 to 3 µm.

Particularly good results are obtained if in method step (B) a coating composition, more particularly as described above, is applied to the substrate to generate the gas corrosion layer, and this is followed by crosslinking and/or curing.

Customarily in method step (B) the coating is performed by the oxygen barrier coating and/or the coating composition being applied to the substrate, more particularly to the cathodic corrosion control layer, by means of spraying, dipping, spin coating, dip-spin coating, knife coating or rolling, more particularly by means of spraying, dipping, spin coating or dip-spin coating, preferably by means of spraying.

For the purposes of the present invention it is preferred if in method step (B) the coating composition is crosslinked and/or cured at room temperature. In this context the crosslinking and/or curing operation is carried out customarily for a period of 1 minute to 2 hours, more particularly 1 minute to 60 minutes, preferably 3 to 45 minutes, more preferably 5 to 30 minutes.

For the purposes of the present invention, however, provision may also be made for the coating composition in method step (B) to be crosslinked and/or cured at elevated temperature and/or by irradiation, preferably at elevated temperature. If the coating composition in method step (B) is crosslinked and/or cured at elevated temperature, then the temperatures are customarily in the range from 30 to 350° C., preferably 50 to 150° C., more preferably 40 to 200° C.

It is preferred here if the coating composition is crosslinked and/or cured within a period of 1 minute to hours, more particularly 2 minutes to 1 hour, preferably 3 to 30 minutes, more preferably 4 to 20 minutes, very preferably 5 to 15 minutes.

Furthermore, provision may be made in the context of the present invention for the substrate to be prepared for coating in a preparatory method step which precedes the first method step (A).

In this context it has proved advantageous if the substrate is cleaned, more particularly by degreasing. This can be accomplished, for example, by treatment with organic solvents, blasting, abrading, pickling, in particular with acids and/or alkalis, preferably by treatment with organic solvents, blasting and/or abrading. Treatment with organic solvents, blasting and/or abrading prevents hydrogen embrittlement which may occur subsequent to treatment with acids.

According to one particular embodiment of the present invention, provision may be made for an adhesion promoter layer to be applied to the substrate, in particular after the substrate has already been cleaned, and before application of the cathodic corrosion control coating and/or the coating composition in method step (A).

An adhesion promoter layer improves the adhesion between the coating of the invention and the substrate, but also reduces the electrical contact between the cathodic corrosion control layer and the substrate. It has nevertheless emerged that in the context of the present invention, specific adhesion promoter layers or primers can be used without any reduction being observed in the cathodic control effect.

In the context of the present invention it is preferred if the adhesion promoter layer is produced in the form of a conversion layer by treating the substrate with a solution comprising chromium(III) compounds, titanium compounds and/or zirconium compounds. Such conversion layers are good adhesion promoters, but additionally they do not reduce the cathodic corrosion control, or do so at least only to a minor extent. It is also possible for the adhesion promoter layer to be generated by phosphatising, more particularly iron phosphatising or zinc phosphatising. The adhesion promoter layer may also be generated, in the context of the present invention, by treatment with silicate-based pretreatment systems or suitable silanes.

For more extensive details on this aspect of the invention, reference may be made to the observations above concerning the other aspects of the invention, which apply correspondingly in relation to the method of the invention.

Yet further provided by the present invention—according to a fifth aspect of the present invention—is a coated substrate comprising a coating as defined above and optionally an adhesion promoter layer.

For more extensive details on this aspect of the invention, reference may be made to the observations above concerning the other aspects of the invention, which apply correspondingly in relation to the coated substrate of the invention.

Yet further provided by the present invention—according to a sixth aspect of the present invention—is the use of an oxygen barrier coating, more particularly as described above, or of an oxygen barrier coating composition for achieving high-temperature resistance on the part of a cathodic corrosion control coating.

For more extensive details concerning the use of an oxygen barrier coating in accordance with the invention, reference may be made to the other aspects of the invention, which apply correspondingly in relation to the use in accordance with the invention.

Provided further, finally, by the present invention—according to a seventh aspect of the present invention—is the use of a coating composition, more particularly of an oxygen barrier coating composition, preferably as defined above, for improving the temperature stability of a cathodic corrosion control coating.

For more extensive details concerning this aspect of the invention, reference may be made to the observations concerning the other aspects of the invention, which apply correspondingly in relation to the use in accordance with the invention.

FIG. 1 shows a metallic substrate 2 provided with a coating 1 of the invention. The inventive coating 1 consists of a cathodic corrosion control layer 3, which preferably comprises metal particles, more particularly zinc lamellae, and an oxygen barrier layer 4, which preferably comprises aluminium flakes. The metal particles in the cathodic corrosion layer 3 are preferably embedded in an organically based matrix based on organically modified silicon dioxide and titanium dioxide, while the aluminium flakes of the gas corrosion layer 4 are embedded preferably in an organically modified silicon dioxide protective layer having a carbon content of less than 50 wt %, based on the matrix material of the gas corrosion layer 4. The coating 1 and the substrate 2 are optionally connected via an adhesion promoter layer 5.

Alternatively or additionally, according to an embodiment not shown in FIG. 1, there may be a further layer, in particular having adhesion promotion and/or oxygen barrier properties, disposed between the cathodic corrosion control layer 3 and the oxygen barrier layer 4. A multi-ply construction of the coating 1 may in particular minimize the cracking during heating and cooling operations, caused by thermal expansion and contraction.

The present invention is illustrated below by way of example, and in a non-limiting way, by the working examples.

WORKING EXAMPLES

For the experiments below, coating systems with cathodic corrosion control are applied to steel sheets and screws and investigated for their anticorrosive properties, in particular following exposure to temperature.

Various combinations are investigated of cathodic corrosion control coatings, also called basecoat below, and oxygen barrier coatings, also called topcoat below, and are compared with coating systems solely based on cathodic corrosion control coatings.

I. Basecoats

Specified below are the basecoat formulations investigated, and also their application and curing conditions. Also indicated is the point in time the incidence of red rust is likely in the salt spray test according to DIN EN ISO 9227 without prior temperature exposure.

Example 1

Solvent-Based Zinc Flake Primer Based on Pure Zinc Pigmentation

Application: Spraying or dip-spin coating,
Curing: Thermally; 30 minutes at 200° C.
Dry film thickness: 6 to 8 μm

TABLE 1

| Composition of basecoat 1 | |
|---|---|
| Binder component | Parts by weight |
| Trimethoxyvinylsilane | 9.8 |
| Titanium ethylhexanolate (tetra-2-ethylhexyl titanate) | 24.9 |
| n-Butyl polytitanate (titanate-tetrabutanolate, polymeric) | 36.8 |
| Alcohol | 14.5 |
| Antisettling agent | 11.4 |
| Wetting and dispersing additive | 2.6 |
| Binder total | 100.0 |
| Zinc flake | 50.00 |
| Red rust (h salt spray test) | 2000 |

Example 2

Aqueous Zinc Flake Primer Based on Pure Zinc Pigmentation

Application: Spraying or dip-spin coating,
Curing: Thermally; 30 minutes at 200° C.
Dry film thickness: 6 to 8 μm

TABLE 2

| Composition of basecoat 2 | |
|---|---|
| Binder component | Parts by weight |
| Dipropylene glycol (DPG) | 5.25 |
| Epoxy-silane oligomer | 10.00 |
| Isotridecanol, ethoxylated | 4.00 |
| 1-Nitropropane | 0.75 |
| Zinc flake (in DPG) | 50.00 |
| Demineralized water | 32.00 |

TABLE 2-continued

| Composition of basecoat 2 | |
|---|---|
| Binder component | Parts by weight |
| Ortho-phosphoric acid (0.1% solution) | 3.50 |
| Sodium waterglass (25% solution) | 0.50 |
| Sodium dioctylsulphosuccinate (wetting additive) | 0.5 |
| Polyethersiloxane copolymer (defoamer) | 0.5 |
| Xanthan gum (thickener) | 3.00 |
| Red rust (h salt spray test) | 2000 |

Example 3

Solvent-Based Zinc Flake Primer Based on Zinc-Aluminium Pigments (4ZnAl7)

Application: Spraying or dip-spin coating,
Curing: Thermally; 30 minutes at 200° C.
Dry film thickness: 6 to 8 μm

TABLE 3

| Composition of basecoat 3 | |
|---|---|
| Binder component | Parts by weight |
| Trimethoxyvinylsilane | 9.8 |
| Titanium ethylhexanolate (tetra-2-ethylhexyl titanate) | 24.9 |
| n-Butyl polytitanate (titanate-tetrabutanolate, polymeric) | 36.8 |
| Alcohol | 14.5 |
| Antisettling agent | 11.4 |
| Wetting and dispersing additive | 2.6 |
| Binder total | 100.0 |
| Zinc flake | 50 |
| Red rust (h salt spray test) | 2000 |

Example 4

Aqueous Zinc Flake Primer Based on Zinc-Aluminium Pigments (4ZnAl7)

Application: Spraying or dip-spin coating,
Curing: Thermally; 30 minutes at 200° C.
Dry film thickness: 6 to 8 μm

TABLE 4

| Composition of basecoat 4 | |
|---|---|
| Binder component | Parts by weight |
| Dipropylene glycol (DPG) | 5.25 |
| Epoxy-silane oligomer | 10.00 |
| Isotridecanol, ethoxylated | 4.00 |
| 1-Nitropropane | 0.75 |
| Zinc flake (in DPG) | 50.00 |
| Demineralized water | 32.00 |
| Ortho-phosphoric acid (0.1% solution) | 3.50 |
| Sodium waterglass (25% solution) | 0.50 |
| Sodium dioctylsulphosuccinate (wetting additive) | 0.50 |
| Polyethersiloxane copolymer (defoamer) | 0.50 |

TABLE 4-continued

| Composition of basecoat 4 | |
|---|---|
| Binder component | Parts by weight |
| Xanthan gum (thickener) | 3.00 |
| White rust | ++ |
| Red rust (hours) | 2000 |

Example 5

Solvent-Based Zinc Flake Primer Based on Zinc-Bismuth Pigments (5 wt % Bi)

Application: Spraying or dip-spin coating,
Curing: Thermally; 30 minutes at 200° C.
Dry film thickness: 6 to 8 μm

TABLE 5

| Composition of basecoat 5 | |
|---|---|
| Binder component | Weight fraction |
| Trimethoxyvinylsilane | 9.80 |
| Titanium ethylhexanolate (tetra-2-ethylhexyl titanate) | 24.90 |
| n-Butyl polytitanate (titanate-tetrabutanolate, polymeric) | 36.80 |
| Alcohol | 14.50 |
| Antisettling agent | 11.40 |
| Wetting and dispersing additive | 2.60 |
| Binder total | 100.00 |
| Zinc flake | 50.00 |
| Red rust (h salt spray test) | 2000 |

Example 6

Aqueous Zinc Flake Primer Based on Zinc-Bismuth Pigments (5 wt % Bi)

Application: Spraying or dip-spin coating,
Curing: Thermally; 30 minutes at 200° C.
Dry film thickness: 6 to 8 μm

TABLE 6

| Composition of basecoat 6 | |
|---|---|
| Binder component | Weight fraction |
| Dipropylene glycol (DPG) | 5.25 |
| Epoxy-silane oligomer | 10.00 |
| Isotridecanol, ethoxylated | 4.00 |
| 1-Nitropropane | 0.75 |
| Zinc flake (in DPG) | 50.00 |
| Demineralized water | 32.00 |
| Ortho-phosphoric acid (0.1% solution) | 3.50 |
| Sodium waterglass (25% solution) | 0.50 |
| Sodium dioctylsulphosuccinate (wetting additive) | 0.50 |
| Polyethersiloxane copolymer (defoamer) | 0.50 |
| Xanthan gum (thickener) | 3.00 |
| Red rust (h salt spray test) | 2000 |

Example 7

Solvent-Based Zinc Flake Primer Based on Zinc-Aluminium-Magnesium Pigments (ZnMg8Al8)

Application: Spraying or dip-spin coating,
Curing: Thermally; 30 minutes at 200° C.
Dry film thickness: 6 to 8 μm

TABLE 7

| Composition of basecoat 7 | |
| --- | --- |
| Binder component | Parts by weight |
| Trimethoxyvinylsilane | 9.80 |
| Titanium ethylhexanolate (tetra-2-ethylhexyl titanate) | 24.90 |
| n-Butyl polytitanate (titanate-tetrabutanolate, polymeric) | 36.80 |
| Alcohol | 14.50 |
| Antisettling agent | 11.40 |
| Wetting and dispersing additive | 2.60 |
| Binder total | 100.00 |
| Zinc flake | 50.00 |
| Red rust (h salt spray test) | 2000 |

Example 8

Aqueous Zinc Flake Primer Based on Zinc-Aluminium-Magnesium Pigments (ZnMg8Al8)

Application: Spraying or dip-spin coating,
Curing: Thermally; 30 minutes at 200° C.
Dry film thickness: 6 to 8 μm

TABLE 8

| Composition of basecoat 8 | |
| --- | --- |
| Binder component | Weight fraction |
| Dipropylene glycol (DPG) | 5.25 |
| Epoxy-silane oligomer | 10.00 |
| Isotridecanol, ethoxylated | 4.00 |
| 1-Nitropropane | 0.75 |
| Zinc flake (in DPG) | 50.00 |
| Demineralized water | 32.00 |
| Ortho-phosphoric acid (0.1% solution) | 3.50 |
| Sodium waterglass (25% solution) | 0.50 |
| Sodium dioctylsulphosuccinate (wetting additive) | 0.50 |
| Polyethersiloxane copolymer (defoamer) | 0.50 |
| Xanthan gum (thickener) | 3.00 |
| Red rust (hours) | 2000 |

Example 9

Solvent-Based Zinc Flake Primer Based on Zinc-Magnesium Pigments (>5 wt % Mg)

Application: Spraying or dip-spin coating,
Curing: Thermally; 30 minutes at 200° C.
Dry film thickness: 6 to 8 μm

TABLE 9

| Composition of basecoat 9 | |
| --- | --- |
| Binder component | Weight fraction |
| Trimethoxyvinylsilane | 9.80 |
| Titanium ethylhexanolate (tetra-2-ethylhexyl titanate) | 24.90 |
| n-Butyl polytitanate (titanate-tetrabutanolate, polymeric) | 36.80 |
| Alcohol | 14.50 |
| Antisettling agent | 11.40 |
| Wetting and dispersing additive | 2.60 |
| Binder total | 100.00 |
| Zinc flake | 50.00 |
| Red rust (h salt spray test) | 2000 |

Example 10

Aqueous Zinc Flake Primer Based on Zinc-Magnesium Pigments (>5 wt % Mg)

Application: Spraying or dip-spin coating,
Curing: Thermally; 30 minutes at 200° C.
Dry film thickness: 6 to 8 μm

TABLE 10

| Composition of basecoat 10 | |
| --- | --- |
| Binder component | Weight fraction |
| Dipropylene glycol (DPG) | 5.25 |
| Epoxy-silane oligomer | 10.00 |
| Isotridecanol, ethoxylated | 4.00 |
| 1-Nitropropane | 0.75 |
| Zinc flake (in DPG) | 50.00 |
| Demineralized water | 32.00 |
| Ortho-phosphoric acid (0.1% solution) | 3.50 |
| Sodium waterglass (25% solution) | 0.50 |
| Sodium dioctylsulphosuccinate (wetting additive) | 0.50 |
| Polyethersiloxane copolymer (defoamer) | 0.50 |
| Xanthan gum (thickener) | 3.00 |
| Red rust (hours) | 2000 |

Example 11

Zinc Flake Primer as Per Example 2 of Basis WO 2009/132102

TABLE 11

| Composition of basecoat 11 | |
|---|---|
| Binder component | % by weight |
| Titanate Tyzor TnBT | 20.8 |
| Zinc GTT | 56.3 |
| Solvent M-P-A 4020 X from Elementis | 1.0 |
| Ethylcellulose N-200 from Ashland | 0.7 |
| Solvent mixture: | 21.2 |
| Benzyl alcohol 24 wt % | |
| Toluene 23 wt % | |
| MIBK 24 wt % | |
| Solvesso 100 24 wt % | |
| n-Butanol 5 wt % | |

Example 12

Zinc Flake Primer as Per Example C1 of WO 2009/132102

TABLE 12

| Composition of basecoat 12 | |
|---|---|
| Binder component | % by weight |
| Tyzor TOT from Dorf Ketal (alkoxytitanate) | 21.8 |
| MACOL 98 B (ethylene oxide-bisphenol A adduct) | 1.1 |
| M-P-A 4020 X | 0.7 |
| Stapa 4ZnAl7 (ZnAl pigment) | 51.4 |
| Ethylcellulose N-200 | 0.7 |
| Solvent mixture from Example 11 | 24.3 |

Example 13

Zinc Flake Primer as Per Example 12 with Zinc-Aluminium-Magnesium Pigment

TABLE 13

| Composition of basecoat 13 | |
|---|---|
| Binder component | % by weight |
| Tyzor TOT from Dorf Ketal | 21.8 |
| MACOL 98 B | 1.1 |
| M-P-A 4020 X | 0.7 |
| ZnMgAl flake | 51.4 |
| Ethylcellulose N-200 | 0.7 |
| Solvent mixture from Example 11 | 24.3 |

Example 14

Electrolytically Galvanized Substrate

The zinc layer is deposited from an acidic electrolyte onto EG flat steel. The substrate thickness with zinc add-on is 5 mm.

Example 15

Hot-Dip-Galvanized Surface with 10 µm Zinc Layer Thickness

II. Topcoats

The examples below specify the formulations of the topcoats used.

Examples 16 to 18

Topcoats Based on Aqueous Siloxane Dispersions

Topcoat T16 as per Example 16 and topcoat T18 as per Example 18 are clearcoats and contain no metal particles. Topcoat T16 contains glass flakes.

Topcoat T17 as per Example 17 contains aluminium pigments.

TABLE 14

| Composition of topcoats T16 to T18 | | | |
|---|---|---|---|
| | Parts by weight | | |
| | T16 | T17 | T18 |
| Alkoxy-methylpolysiloxane as 50 wt % dispersion in water | | 35.00 | |
| Anti Terra 250 (wetting and dispersing additive) | | 3.30 | |
| Glass flakes 001 | 10.00 | | |
| Decomet 1006/30 (Al pigment) | | 10.00 | |
| Demineralized water | | 41.70 | 36.70 |
| Optigel solution (rheological additive) | 20.00 | 20.00 | |
| Dynasylan Hydrosil 2926 (organo-functional siloxane oligomer) | 35.00 | | 50.00 |
| Lipo | 35.00 | | |
| Levasil 200 B (silica sol) | | | 13.30 |
| Byk 349 (surfactant) | | | 0.20 |
| Total | 100.00 | 110.00 | 100.20 |

Example 19 Topcoat T19

Topcoat as Per Example 3 of U.S. Pat. No. 7,645,404

120 g of MTES (alkyltrialkoxysilane) from Evonik and 40 g of tetraethoxysilane are mixed with 100 g of a 1% trifluoroacetic acid solution and the silanes are hydrolyzed with stirring. Then 150 g of a solvent mixture are added (butyl glycol), 0.2 g of Disperbyk 180 and 35 g of aluminium pigment.

Example 20 (Topcoat 20)

Hot-Dip Aluminizing with a Layer Thickness of 5 µm

III. Use Examples

Example 21: Basecoat and Topcoat Systems in Salt Spray Testing after Thermal Exposure at 400° C. for 48 Hours Different coatings are applied to DCO4 steel panels which have been subjected to alkaline degreasing and cleaned by means of a blasting operation. The basecoat is applied, in accordance with Examples 1 to 15, and dried. The topcoat is applied with a dry film thickness of 2 to 4 μm and is dried at room temperature.

Subsequently, using a scribe tool, a scribe mark down to the steel sheet is produced in the coating, and the specimen thus prepared is subjected to a salt spray test according to DIN EN ISO 9227. Table 15 summarizes the times ascertained in the salt spray test until red rust appears at the scribe mark.

TABLE 15

Time in hours to incidence of red rust at the scribe mark in the salt spray test for different coating systems after prior temperature exposure at 400° C. over 48 hours

| Basecoat from example | No topcoat | T16 | T17 | T18 |
|---|---|---|---|---|
| 1 | <<50 h | <<50 h | <100 h | <<50 h |
| 2 | <<50 h | <<50 h | <100 h | <<50 h |
| 3 | <<10 h | <<10 h | >200 h | <<10 h |
| 4 | <<100 h | <<100 h | >200 h | <<100 h |
| 5 | <<100 h | <<100 h | >200 h | <<100 h |
| 6 | <<100 h | <<100 h | >200 h | <<100 h |
| 7 | <<150 h | <<100 h | >>200 h | <<100 h |
| 8 | <<150 h | <<100 h | >>200 h | <<100 h |
| 9 | <<100 h | <<100 h | >200 h | <<100 h |
| 10 | <<100 h | <<100 h | >200 h | <<100 h |
| 11 | <50 h | <<100 h | >200 h | <<100 h |
| 12 | <50 h | <<100 h | >200 h | <<100 h |
| 13 | <150 h | <<100 h | >>200 h | <<100 h |
| 14 | <100 h | <<100 h | >200 h | <<100 h |
| 15 | <100 h | <<100 h | >200 h | <<100 h |

FIGS. 2 and 3 show the influence of the basecoat on the temperature stability of the cathodic corrosion control effect, as is also evident from Table 15, in the further form of an image.

FIG. 2 shows a steel panel, provided with the basecoat as per Example 11, i.e. with a zinc flake coating with lamellae based on pure zinc, following a salt spray test according to DIN EN ISO 9227 after a test duration of 24 hours. The coated steel panel was subjected to a temperature of 400° C. over 48 hours. After 24 hours in the salt spray test, significant formation of red rust is already apparent both at the scribe mark and in the surface of the steel sheet.

FIG. 3 shows a steel panel provided with the basecoat as per Example 7, i.e. with a zinc flake coating with lamellae based on a zinc-aluminium-magnesium alloy, following a salt spray test according to DIN EN ISO 9227 after a test duration of 72 hours. The coated steel panel was likewise subjected to a temperature of 400° C. over 48 hours. Only after 72 hours in the salt spray test was there significant formation of red rust apparent at the scribe mark, and also initial areas of red rust in the surface of the coated steel panel.

The data in the table and the FIGS. 2 and 3 demonstrate impressively that with the use of zinc lamellae based on zinc alloys, especially zinc-aluminium-magnesium alloys, relative to zinc flake coatings with lamellae based on pure zinc, it is possible to achieve a significant improvement in the temperature stability of the cathodic corrosion control.

Example 22: Comparative Corrosion Testing Over Different Temperatures

Various basecoat systems are applied as described above to steel sheets and, by dip-spin coating, to screws. The thickness of the dried or cured basecoat is 5 to 8 μm. Subsequently, some of the substrates receive a topcoat, applied with a layer thickness of 2 to 4 μm, and the coating system is exposed to an elevated temperature over a defined period of time. The corrosion resistance of the coatings is subsequently evaluated for steel sheets in a salt spray test with scribe mark according to DIN EN ISO 9227, and for screws in a salt spray test without scribe mark, based on DIN EN ISO 9227.

The temperature exposure of the substrates is 450° C. over 48 hours, 500° C. over 48 hours, and 300° C. over 30 days.

The results of the comparative corrosion testing are indicated in Table 16 below, in each case by reference to the topcoat-free systems.

The results of the tests are evaluated in Table 16 as follows:

+++ In all three tests at elevated temperatures, in the salt spray test the time before red rust is formed at the scribe mark is at least twice that of substrates coated only with a basecoat based on a pure zinc flake coating.

++ In two tests at elevated temperatures, in the salt spray test the time before red rust is formed at the scribe mark is at least twice that of substrates coated only with a basecoat based on a pure zinc flake coating.

+ In one test at elevated temperature, in the salt spray test the time before red rust is formed at the scribe mark is at least twice that of substrates coated only with a basecoat based on a pure zinc flake coating.

− Gradual improvement in the temperature stability of the corrosion control in the salt spray test relative to a basecoat based on a pure zinc flake coating.

−− No improvement relative to a basecoat based on a pure zinc flake coating.

TABLE 16

Comparative corrosion testing of various coating systems over three different temperature exposures by reference to the respective topcoat-free systems

| Basecoat as per example | No topcoat | T16 | T17 | T18 | T19 | T20 |
|---|---|---|---|---|---|---|
| 1 | −− | −− | + | −− | + | + |
| 2 | −− | −− | + | −− | + | + |
| 3 | −− | −− | + | −− | + | + |
| 4 | −− | −− | + | −− | + | + |
| 5 | −− | −− | ++ | −− | + | + |
| 6 | −− | −− | ++ | −− | + | ++ |
| 7 | −− | −− | +++ | −− | +++ | +++ |
| 8 | −− | −− | +++ | −− | +++ | +++ |
| 9 | + | ++ | ++ | ++ | ++ | ++ |
| 10 | + | ++ | ++ | ++ | ++ | ++ |
| 11 | −− | −− | + | −− | + | + |
| 12 | + | ++ | + | ++ | + | ++ |
| 13 | + | ++ | +++ | ++ | ++ | ++ |
| 14 | − | − | + | − | + | ++ |
| 15 | − | − | + | − | + | ++ |

Example 23: Comparison of Coating Systems with and without Oxygen Barrier Layer (Topcoat)

A) Coating of Screws

The basecoat as per Example 7 is applied by dip-spin coating to steel screws, with a dry film thickness of 6 to 8 μm. Some of the coated substrates are coated with the topcoat composition T17 as per Example 17, comprising aluminium pigments, with a layer thickness of 2 to 4 μm, and dried at room temperature. The coated screws are exposed to elevated temperatures of between 300 and 500° C., and the corrosion resistance is subsequently evaluated in the salt spray test without scribe mark, based on DIN EN ISO 9227. The results are compiled in Table 17 below.

TABLE 17

Corrosion resistance of coated steel screws with and without topcoat; time in the salt spray test before incidence of red rust

| Temperature exposure | | | | | | |
|---|---|---|---|---|---|---|
| Temperature [° C.] | RT | 300 | 300 | 300 | 400 | 500 |
| Time [h] Salt spray test | | 240 | 480 | 720 | 48 | 48 |
| without topcoat [h] | 1700 | 700 | 100 | <100 | 72 | 64 |
| with topcoat [h] | >2500 | >>800 | >600 | >600 | 260 | 230 |

(B) Coating of Steel Sheets

The basecoat as per Example 7 is applied to steel sheets, with a dry film thickness of 6 to 8 µm. Some of the coated substrates are coated with the topcoat composition T17 as per Example 17, with a layer thickness of 2 to 4 µm, and dried at room temperature. The coated sheets are exposed to elevated temperatures of between 300 and 500° C., and the corrosion resistance is subsequently evaluated in the salt spray test with scribe mark according to DIN EN ISO 9227. The results are compiled in Table 18 below.

TABLE 18

Corrosion resistance of coated steel panels with and without topcoat; time in the salt spray test before incidence of red rust

| Temperature exposure | | | | | | |
|---|---|---|---|---|---|---|
| Temperature [° C.] | RT | 300 | 300 | 300 | 400 | 500 |
| Time [h] Salt spray test | | 240 | 480 | 720 | 48 | 48 |
| without topcoat [h] | 245 | 700 | 400 | 300 | 72 | 72 |
| with topcoat [h] | 0950 | >>800 | >>800 | >>800 | >230 | >230 |

The values compiled in Table 16 are shown once again in image form in FIGS. 3 to 6, for measurements after prior temperature exposure at 400° C. and 500° C.

FIG. 3—as observed above—shows a steel sheet provided with the basecoat as per Example 7, following a salt spray test according to DIN EN ISO 9227, after a test duration of 72 hours. Before the salt spray test was carried out, the coated steel sheet was exposed to a temperature of 400° C. over 48 hours. After 72 hours, there is clear formation of red rust apparent at the scribe mark, and also initial areas of red rust in the surface of the coated steel sheet.

FIG. 4 shows a steel sheet coated with the basecoat as per Example 7 and also with the topcoat composition T17 as per Example 17, following a salt spray test according to DIN EN ISO 9227, after a test duration of more than 230 hours. The coated steel sheet was likewise exposed to a temperature of 400° C. over 48 hours. After more than 230 hours in the salt spray test, there is initial red rust apparent at the scribe mark, while in the surface there is as yet no rust formation in evidence.

FIG. 5 shows a steel sheet coated with the basecoat as per Example 7, following a salt spray test carried out according to DIN EN ISO 9227, after a test duration of 72 hours. The steel sheet was exposed to a temperature of 500° C. over 48 hours. Severe red rusting is evident both at the scribe mark and in the surface.

FIG. 6, lastly, shows a steel sheet coated with the basecoat as per Example 7 and also with the topcoat composition T17 as per Example 17, following a salt spray test according to DIN EN ISO 9227, after a test duration of more than 230 hours. The coated steel sheet was exposed to a temperature of 500° C. over 48 hours. As can be seen from FIG. 7, there is only extremely slight formation of red rust at the scribe mark in the salt spray test, even after more than 230 hours, and no red rust at all in the surface.

The measurement values in Tables 17 and 18 and also the representation in the figures are an impressive demonstration that on the one hand, through the use of zinc flake coatings based on zinc-aluminium-magnesium alloys, in comparison to zinc flake coatings based on pure zinc, a distinctly improved corrosion control at elevated temperature is achieved, and, on the other hand, the corrosion control at elevated temperature can be further massively increased by an oxygen barrier coating.

Very surprisingly, this is true not only of sheets, but also of screws, which because of the thread are disproportionately more difficult to provide with a uniform coating and to protect from corrosion.

| List of reference numerals: | |
|---|---|
| 1 | Corrosion control coating |
| 2 | Substrate |
| 3 | Cathodic corrosion control layer |
| 4 | Oxygen barrier layer |
| 5 | Adhesion promoter layer |

The invention claimed is:

1. A coating, for generating cathodic high-temperature corrosion protection on a metallic substrate, comprising at least two layers,
    characterized by
    a) a first layer in the form of a cathodic corrosion control coating,
        wherein the first layer is a first inorganic matrix comprising metal particles,
        wherein the metal particles are selected from the group consisting of pure zinc, zinc alloys, and combinations thereof, and
        wherein the first inorganic matrix further comprises oxides selected from the group consisting of oxides of silicon, of oxides of titanium, oxides of zirconium, and combinations thereof, and
    b) a second layer in the form of a coating selected from the group consisting of a corrosion control coating, and an oxygen barrier coating,
        wherein the second layer comprises a second inorganic matrix formed by oxides selected from the group consisting of oxides of silicon, oxides of titanium, oxides of zirconium, and combinations thereof,
        wherein the second layer further comprises aluminium particles in the range from 35 to 95 wt %, based on the second layer, and
        wherein the second layer is free from zinc.

2. The coating according to claim 1, wherein the coating has a layer thickness in the range from 0.5 to 200 µm.

3. The coating according to claim 1,
wherein the first layer has a layer thickness in the range from 0.1 to 180 μm.

4. The coating according to claim 3, characterized:
in that the first layer includes at least 50 wt % of metal particles, based on the first layer.

5. The coating according to claim 3, wherein the zinc alloys are selected from the group consisting of zinc-bismuth alloys, zinc-aluminium alloys and zinc-aluminium-magnesium alloys.

6. The coating according to claim 5, wherein the zinc alloys selected include zinc-bismuth alloys.

7. The coating according to claim 5, wherein the zinc alloys selected include zinc-aluminium alloys.

8. The coating according to claim 5, wherein the zinc alloys selected include zinc-aluminium-magnesium alloys.

9. The coating according to claim 3, characterized: in that the first layer includes a fraction of metal particles in the range from 50 to 95 wt %.

10. The coating according to claim 1, wherein the first inorganic-matrix of the first layer, is organically modified.

11. The coating according to claim 1, wherein the second layer has a layer thickness in the range from 0.1 to 50 μm.

12. The coating according to claim 11, wherein at least one inorganic-matrix is organically modified.

13. The coating according to claim 11, wherein the at least one inorganic-matrix has a carbon content in the range from 0.01 to 50 wt %, based on the at least one inorganic-matrix.

14. A coated substrate comprising a corrosion control coating according to claim 13 and optionally an adhesion promoter layer.

15. The coating according to claim 11, wherein the at least one inorganic matrix is an inorganic matrix having a carbon content of not more than 50 wt % based on the at least one inorganic matrix.

16. The coating according to claim 11, wherein the second layer comprises an inorganic matrix, in amounts of 50 to 100 wt %, based on the second layer.

17. The coating according to claim 1, wherein the first layer comprises zinc lamellae as platelet-shaped metal particles, and wherein the zinc lamellae are selected from the group consisting of pure zinc lamellae, zinc alloy lamellae, and combinations thereof.

18. A method for producing a cathodic high-temperature corrosion control coating on a metallic substrate, including:
(A) in a first method step, a coating selected from the group consisting of a corrosion control coating, a coating composition for producing a cathodic corrosion control layer, and combinations thereof is applied to the metallic substrate, to give a cathodic corrosion control layer,
wherein the first layer is formed on the basis of a first inorganic matrix comprising metal particles,
wherein the metal particles are formed on the basis of metal particles selected from the group consisting of pure zinc, zinc alloys, and combinations thereof,
wherein the first inorganic matrix comprises oxides selected from the group consisting of oxides of silicon, of oxides of titanium, oxides of zirconium, and combinations thereof, and
(B) in a subsequent second method step, a corrosion control coating for producing an oxygen barrier layer is applied to the substrate, to give an oxygen barrier layer,
wherein the oxygen barrier layer comprises a second inorganic matrix,
wherein the second inorganic matrix is formed by oxides selected from the group consisting of oxides of silicon, oxides of titanium, oxides of zirconium, and combinations thereof,
wherein the oxygen barrier layer comprises aluminium particles in the range from 35 to 95 wt %, based on the oxygen barrier layer, and
wherein the second layer is free from zinc.

* * * * *